United States Patent
Leibetseder et al.

(10) Patent No.: US 12,005,791 B2
(45) Date of Patent: *Jun. 11, 2024

(54) VEHICLE CONNECTION DEVICE, GROUND CONTACT UNIT, VEHICLE COUPLING SYSTEM AND METHOD FOR AUTOMATICALLY CONDUCTIVELY CONNECTING A VEHICLE CONTACT UNIT WITH A GROUND CONTACT UNIT

(71) Applicant: Easelink GmbH, Graz (AT)

(72) Inventors: Manuel Leibetseder, Graz (AT); Hermann Stockinger, Graz (AT); Manuel Laublaettner, Graz (AT)

(73) Assignee: EASELINK GMBH (AT)

(*) Notice: Subject to any disclaimer, the term of this patent is extended or adjusted under 35 U.S.C. 154(b) by 0 days.

This patent is subject to a terminal disclaimer.

(21) Appl. No.: 18/123,145

(22) Filed: Mar. 17, 2023

(65) Prior Publication Data

US 2023/0356608 A1 Nov. 9, 2023

Related U.S. Application Data

(62) Division of application No. 16/646,762, filed as application No. PCT/EP2018/074341 on Sep. 10, 2018, now Pat. No. 11,634,040.

(30) Foreign Application Priority Data

Sep. 12, 2017 (DE) ................... 10 2017 121 105.5

(51) Int. Cl.
*B60L 53/14* (2019.01)
*B60L 53/30* (2019.01)
(Continued)

(52) U.S. Cl.
CPC ............... *B60L 53/14* (2019.02); *B60L 53/30* (2019.02); *B60L 53/36* (2019.02); *H02J 7/0045* (2013.01); *B60L 53/12* (2019.02); *B60L 53/38* (2019.02)

(58) Field of Classification Search
CPC .......... B60L 53/12; B60L 53/14; B60L 53/30; B60L 53/36; B60L 53/38; H02J 7/0045
(Continued)

(56) References Cited

U.S. PATENT DOCUMENTS

| | | | | |
|---|---|---|---|---|
| 5,654,621 A | * | 8/1997 | Seelig | ...................... H02J 50/12 |
| | | | | 320/108 |
| 6,307,347 B1 | * | 10/2001 | Ronning | ................. B60L 53/16 |
| | | | | 320/109 |

(Continued)

FOREIGN PATENT DOCUMENTS

| | | |
|---|---|---|
| DE | 202010015377 U1 | 11/2011 |
| DE | 102013110548 A1 | 3/2015 |

(Continued)

OTHER PUBLICATIONS

International Search Report issued in International Application No. PCT/EP2018/074341, issued Nov. 12, 2018, 4 pages.

*Primary Examiner* — Edward Tso
*Assistant Examiner* — Aaron Piggush
(74) *Attorney, Agent, or Firm* — Dilworth IP, LLC

(57) ABSTRACT

A ground contact unit, an automatic vehicle coupling system as well as a method for automatically, conductively connecting a vehicle contact unit to a ground contact unit. A vehicle connection device of a vehicle battery charging system has a vehicle contact unit including a base with a contacting area in which at least one first contact electrode, at least one second contact electrode and at least one third contact electrode. The vehicle connection device is moveable towards the ground contact unit in a contact direction (Continued)

and an aligning actuator of the vehicle connection device is connected to the base in such a way that it can rotate the base about an axis of rotation that runs substantially in the contact direction.

18 Claims, 9 Drawing Sheets

(51) Int. Cl.
  *B60L 53/36* (2019.01)
  *H02J 7/00* (2006.01)
  *B60L 53/12* (2019.01)
  *B60L 53/38* (2019.01)

(58) Field of Classification Search
  USPC .................................. 320/104, 107, 109
  See application file for complete search history.

(56) References Cited

U.S. PATENT DOCUMENTS

| | | | |
|---|---|---|---|
| 8,373,389 | B2 | 2/2013 | Badger |
| 8,890,475 | B1 | 11/2014 | Becker |
| 9,090,169 | B2 | 7/2015 | Ang et al. |
| 9,742,112 | B1 | 8/2017 | Dubbaka |
| 9,802,490 | B2 | 10/2017 | Mita |
| 9,944,192 | B2 | 4/2018 | Ricci |
| 11,305,664 | B2 * | 4/2022 | Jernej ............. B60L 53/60 |
| 2009/0272587 | A1 * | 11/2009 | Ippolito ........... B60L 8/003 |
| | | | 320/109 |
| 2013/0015699 | A1 | 1/2013 | Mita |
| 2014/0002024 | A1 | 1/2014 | Ang et al. |
| 2015/0336677 | A1 | 11/2015 | Smaoui et al. |
| 2016/0207409 | A1 | 7/2016 | Ueo |
| 2016/0336772 | A1 * | 11/2016 | Dallachiesa ........ H02J 7/0042 |
| 2017/0328740 | A1 | 11/2017 | Widmer et al. |
| 2018/0001777 | A1 | 1/2018 | Kilic |
| 2019/0009680 | A1 * | 1/2019 | Kauffmann ......... B60L 53/126 |
| 2020/0101856 | A1 * | 4/2020 | Klausner ............ B60L 53/35 |

FOREIGN PATENT DOCUMENTS

| | | |
|---|---|---|
| EP | 2069162 B1 | 6/2009 |
| EP | 2625947 A1 | 8/2013 |
| JP | IPH02168801 A | 6/1990 |
| JP | H08502640 A | 3/1996 |
| JP | 2005168233 A | 6/2005 |
| JP | 2008054438 A | 3/2008 |
| JP | 2010501158 A | 1/2010 |
| JP | 2013017274 A | 1/2013 |
| JP | 2013021886 A | 1/2013 |
| JP | 2014150642 A | 8/2014 |
| JP | 2016206884 A | 12/2016 |
| KR | 20100050653 A | 5/2010 |
| KR | 20170083856 A | 7/2017 |
| WO | 2012127648 A1 | 9/2012 |
| WO | 2016096194 A1 | 6/2016 |

* cited by examiner

VEHICLE CONNECTION DEVICE, GROUND CONTACT UNIT, VEHICLE COUPLING SYSTEM AND METHOD FOR AUTOMATICALLY CONDUCTIVELY CONNECTING A VEHICLE CONTACT UNIT WITH A GROUND CONTACT UNIT

FIELD OF THE INVENTION

The disclosure relates to a vehicle connection device for a vehicle battery charging system, a ground contact unit for a vehicle battery charging system, an automatic vehicle coupling system and a method for automatically, conductively connecting a vehicle contact unit to a ground contact unit.

BACKGROUND

In the case of electrically powered vehicles, such as plug-in hybrid vehicles and pure electric vehicles, the vehicle batteries need to be charged regularly, preferably after each journey. To this end, the vehicle is connected to a power source, for example the local electricity network, by means of a vehicle coupling system. To this end, a male connector, such as the type 2 connector, can be used that needs to be plugged into the corresponding female connector of the vehicle by a person manually.

For example, vehicle coupling systems for vehicle battery charging systems comprising a contact unit of the power connection which are provided on the ground are known. This ground contact located on the ground is physically contacted by means of a moveable vehicle contact unit that can move downwards from the underbody of the vehicle. This allows the vehicle to be electrically connected to the local electricity network.

In this regard, it is necessary that the electrodes provided on the vehicle contact unit physically come into contact with the contact surfaces of the ground contact unit. In addition to this, not only the vehicle contact unit must be positioned above the ground contact unit when parking the vehicle, but the correct electrodes of the vehicle contact unit must also rest on the corresponding contact surfaces of the ground contact unit as the electrodes and contact surfaces have different functions.

Within the scope of this disclosure, electrodes are understood to mean electrical contacts that are provided for forming an electrical connection to the corresponding contact surfaces.

Moreover, the protective earth conductor of an electrical configuration is meant by "earthing", the live conductor of an electrical configuration is meant by "phase conductor" and the neutral conductor of an electrical configuration is meant by "neutral contact" or the like.

It is therefore the object of the disclosure to provide a vehicle connection device, a ground contact unit, an automatic vehicle coupling system as well as a method for automatically conductively connecting a vehicle contact unit to a ground contact unit that makes it possible to electrically connect a vehicle contact unit to a ground contact unit physically in an automatic way and to eliminate defective contacting.

SUMMARY

The object is solved by means of a vehicle connection device for a vehicle battery charging system for automatically conductively connecting a vehicle contact unit to a ground contact unit.

The vehicle connection device includes a vehicle contact unit that has a base with a contacting area in which at least one first contact electrode, at least one second contact electrode and at least one third contact electrode are provided, wherein the vehicle contact unit is moveable towards the ground contact unit in a contact direction in order to bring said at least one first contact electrode, said at least one second contact electrode and said at least one third contact electrode into contact with the ground contact unit. The vehicle contact unit also has an aligning actuator that is connected to the base in such a way that it can rotate the base about an axis of rotation running in the contact direction substantially.

As the base and thus the contact electrodes of the vehicle contact unit are rotatable, the vehicle must not be positioned over the ground contact unit particularly precisely. If the contact electrodes of the vehicle contact unit are not contacting their corresponding contact surfaces of the ground contact unit after being lowered, this misalignment can be remedied by rotating the base and thus the contact electrodes facing the vehicle. The base and the vehicle-facing contact electrodes are rotated clockwise or anticlockwise until all contact electrodes of the vehicle contact unit physically contact the corresponding contact surfaces of the ground contact unit. This facilitates the positioning of the vehicle and also prevents defective contacting reliably.

The axis of rotation can be perpendicular to the surface of the base with the contacting area. The maximum rotational angle of the base is, for example, at least 120°. When used as intended, the contacting area of the vehicle contact unit faces the ground contact unit.

The vehicle connection device is configured for bringing the vehicle contact unit into physical contact with a ground contact unit correctly without the manual intervention of a person, i.e. it can be part of an automatic, conductive vehicle battery charging system. To this end, a conductive, i.e. galvanic connection is generated by physically contacting the contact electrodes and the contact surfaces directly. This contrasts with inductive charging systems in which there is no direct contact.

For example, said at least one first contact electrode is at least an earthing contact electrode, said at least one second contact electrode is at least one neutral electrode or at least one positive direct-current contact electrode and/or said at least one third contact electrode is at least a phase electrode or at least a negative direct-current contact electrode. In this way, the vehicle connection device is suitable for use with alternating current or direct current.

For example, the earthing contact electrode is connected to a protective earth conductor of an on-board power supply of the vehicle, the phase electrode is connected to the phase conductor or a live conductor of the on-board power supply of the vehicle and the neutral electrode is connected to a neutral conductor of the on-board power supply of the vehicle. In particular, the functions of the phase electrode and the neutral electrode are not interchangeable by a control unit.

Three second contact electrodes, three third contact electrodes and three, six or seven first contact electrodes are provided in the contacting area.

Preferably, said at least one first contact electrode, said at least one second contact electrode and said at least one third contact electrode are arranged together on the contact side of the base on the lattice points of a base lattice in the form of a two-dimensional Bravais lattice. The base lattice can be a hexagonal lattice. In this way, a specific and repeatable arrangement of the contact electrodes on the base is possible, thereby simplifying contacting with the ground contact unit.

The contact side of the base is the side of the base that is facing the ground contact unit during intended use.

In an embodiment of the disclosure, a magnetic area is provided in the contacting area, in particular at the centre point of the contacting area, in said magnetic area a contact magnet is located, in particularly moveably vertically, in or on the base, wherein the contact magnet determines the position of the axis of rotation. Thus, a simple axis of rotation determined with certainty is defined. The axis of rotation runs preferably through the centre point of the magnet. The magnetic area can, but does not have to have a contact electrode. The contact magnet is, for example, switchable.

Using several magnetic areas on the base that define the position of the base or the axis of rotation on the ground contact unit at several points of the contacting area is also conceivable.

Preferably, one of said at least one first contact electrode, said at least one second contact electrode and said at least one third contact electrode, in particular a first contact electrode, is located in the magnetic area. The contact magnet is assigned to the contact electrode located in the magnetic area, thereby ensuring no space is wasted by the magnetic area.

In a variant, the magnetic area is on a lattice point of the base lattice, wherein contact electrodes are provided on the concentrically configured, most adjacent lattice points, in particular alternating second contact electrodes and third contact electrodes. In this regard, the closest adjacent lattice points are the closest neighbouring points, thus those lattice points with the smallest distance to the lattice point on which the magnetic area is located. Thus, defective contacting between the contact electrodes and the corresponding contact surfaces on the ground contact unit can be remedied merely by rotating about the magnetic area.

Contact electrodes, in particular first contact electrodes, can be provided on the second closest lattice points adjacent to the magnetic area, thereby making it possible to increase the number of usable lattice points.

It is however conceivable that contact electrodes are provided again on the third closest lattice points, in particular alternating second contact electrodes and third contact electrodes. However, in this regard, no identical contact electrodes are adjacent to each other. Rather, sublattices of the first, second and third contact electrodes can be formed, similar to the sublattices of the ground contact unit.

To make it possible to connect the vehicle to a three-phase alternating current source by means of a vehicle connection device, at least three second contact electrodes and/or at least three third contact electrodes are provided for transmitting three-phase alternating current, wherein at least one of at least three second and/or third contact electrodes is an L1 phase electrode, at least another of said at least three second and/or third contact electrodes is an L2 phase electrode and at least one further one of said three second and/or third contact electrodes is an L3 phase electrode. The L1 phase electrodes, the L2 phase electrodes and the L3 phase electrodes are connected, for example, in each case to one of the live conductors of the on-board power supply of the vehicle.

It is also conceivable that the vehicle can only use one of the phases of the three-phase alternating current that is provided by the ground contact unit as the vehicle, for example, is designed for single-phase alternating current. In this case, only the L1 phase electrode, the L2 phase electrode or the L3 phase electrode is connected to the on-board power supply of the vehicle.

The remaining phase electrodes can then be disconnected on the side facing vehicle.

In an embodiment of the disclosure, the vehicle connection device comprises a signal source for a high-frequency signal and/or a measuring unit for a high-frequency signal in order to check the contacting and assignment of closed contact points, said measuring unit being electrically connected to said at least one first contact electrode, said at least one second contact electrode and/or said at least one third contact electrode. By means of the signal source, a high-frequency signal can be transmitted via the contact point, thereby making it possible to also check whether the contact points function flawlessly during the charging process. By using high-frequency signals, this check is independent of the charging current used and can therefore also occur during the charging process, in particular via the same contact electrodes and contact areas that are also used to transmit charging current.

Within the scope of this disclosure, a high-frequency signal is understood to mean a signal with a frequency equal to or larger than 10 Hz, in particular equal to or larger than 1 kHz, in particular equal to or larger than 200 kHz.

The aligning actuator comprises an electric motor for rotating the base efficiently and particularly precisely, the output shaft of the electric motor being connected to the vehicle contact unit for the purpose of torque transmission.

It is also conceivable that the vehicle connection device comprises a contacting actuator with a vehicle-facing end and a base end, wherein the vehicle contact unit is connected to the base end and the contacting actuator is set up in such a way that it can move the vehicle contact unit in the contact direction. The contacting actuator can include a piston/cylinder unit or a bellows, wherein the bellows is operated, for example, pneumatically.

For example, the base or the vehicle contact unit is connected to the aligning actuator via the contacting actuator. It is however conceivable that the vehicle contact unit or the base is connected to the contacting actuator via the aligning actuator.

Moreover, the object is solved by means of a ground contact unit for a vehicle battery charging system for automatically, conductively connecting the ground contact unit and a vehicle contact unit, comprising a plate-like base body as well as first contact areas, second contact areas and third contact areas that are located on a target surface of the base body in a main lattice in the form of a two-dimensional Bravais lattice.

The first contact areas are arranged in a first sublattice in the form of a two-dimensional Bravais lattice, the second contact areas are arranged in a second sublattice in the form of a two-dimensional Bravais lattice and the third contact areas are arranged in a third sublattice in the form of a two-dimensional Bravais lattice, wherein the first sublattice, the second sublattice and the third sublattice are interlaced with each other. The first contact areas, the second contact areas and the third contact areas occur alternately in the direction of at least one of the base vectors of the main lattice.

By arranged the contact surfaces in a lattice, it is no longer necessary to position the contact areas of the vehicle contact unit exactly on the target surface of the ground contact unit as long as the contact areas are within the main lattice. By exploiting the symmetry of the main lattice and owing to the interlacing arrangement of the sublattices, a correct assignment of the contact electrodes of the vehicle contact unit to the corresponding contact areas or contact surfaces of the ground contact unit can be achieved by rotating the vehicle contact unit.

The lattice points are, for example, the centroid of the contact areas. A contact area is a coherent area in which, in particular, no other area protrudes. A particularly hexagonal or circular conductive contact surface that is the contact surface for the vehicle contact unit can be provided in each case in the contact areas. The hexagon can be a regular hexagon.

It is also conceivable that several contact surfaces are provided in a contact area.

The base lattice substantially corresponds to the main lattice of the ground contact unit.

For example, the ground contact unit comprises a ground control unit as well as a first ground connection, a second ground connection and a third ground connection for connecting the ground contact unit on the ground side. The first contact areas are connected electrically to the first ground connection and the ground control unit is set up to electrically connect the second contact areas between at least two of the first ground connection, the second ground connection and an earthing and/or to electrically connect the third contact areas between at least two of the first ground connection, the third ground connection and an earthing. In this way, a reliable operating mode is made possible if the ground contact unit is not connected to a vehicle contact unit.

In an embodiment of the disclosure, the first contact areas are earthing contact areas, the second contact areas are neutral contact areas or positive direct-current contact areas and/or the third contact areas are phase contact areas or negative direct-current areas. In this way, the manufacturing costs of the ground contact unit can be reduced.

For example, the earthing contact areas are connected electrically to the protective earth conductor of a local electricity network, the neutral contact area is connected electrically to the neutral conductor of the local electricity network and the phase contact area is connected electrically to the phase conductor or the live conductor of the local electricity network.

The ground contact unit can have a ground control unit that is configured in such a way that it can ground the neutral contact areas and/or the phase contact areas and/or can be set to the same potential as the earthing contact areas. To this end, the ground control unit can connect the neutral contact areas and/or the phase contact areas to the protective earth conductor of the power connection. The functions of the phase contact areas and the neutral contact areas within the circuit for transmitting current cannot be changed or interchanged, for example, by the ground control unit.

The target surface with the contact areas is provided, for example, on the upper side of the ground contact unit.

Preferably, at least two of the three sublattices are identical lattices and/or at least two of the main lattice and the three sublattices are of the same type, in particular the main lattice, the first sublattice, the second sublattice and/or the third sublattice are hexagonal lattices. In this regard, identical lattices are understood to mean that they have the same base vectors, but different positions on the target surface of the ground contact unit. For example, the base vectors of the main lattice are one third of the length of the corresponding base vector of one of sublattices. In this regard, a hexagonal lattice is understood to mean a two-dimensional Bravais lattice type of the hexagonal lattice in which the two base vectors have the same value and form an angle of 120° with each other.

In this way, a particular high degree of symmetry of the different lattices is possible, thereby further simplifying the correct positioning of the vehicle contact unit on the ground contact unit.

To make it possible to use three-phase alternating current for charging the battery of the vehicle, at least three second contact areas and/or at least three third contact areas are provided for transmitting a three-phase alternating current, wherein at least one of at least three second and/or third contact areas is an L1 contact area, at least another of at least three second and/or third contact areas is an L2 contact area and at least one further one of at least three second and/or third contact areas is an L3 contact area. Said at least one L1 contact area, said at least one L2 contact area and said at least one L3 contact area occur alternately in the direction of at least one of the base vectors of the third sublattice. In this regard, the L1 contact area, the L2 contact area and the L3 contact area are each connected to one of the live conductors of the, in this case, three-phase local electricity network.

In the event that the vehicle can only use one phase of the three-phase alternating current provided by the ground contact unit, only the L1 contact area, the L2 contact area or the L3 contact area is used for charging the vehicle. The remaining contact areas can be kept potentially free, for example by electrically connecting them to the protective earth conductor.

Magnetic, in particular ferromagnetic elements are provided in or on the base body in the first contact areas, the second contact areas and/or the third contact areas to enable a defined positioning of the vehicle contact unit in relation to the main lattice.

The magnetic elements can each encompass an electrical lead that contacts the corresponding contact area electrically. The magnetic elements can be made of steel. For example, the magnetic elements are steel cylinders, through which the respective electrical lead is guided. In this way, the magnetic element can be configured to save space.

It is also conceivable that the magnetic element is made of a material that not only is magnetic, but also increases the characteristic impedance of the electrical lead against high-frequency signals.

In an embodiment, the ground contact unit comprises a signal source for a high-frequency signal and/or a measuring unit for a high-frequency signal that is electrically connected to the first contact areas, the second contact areas and/or the third contact areas in order to detect a correct contacting over the contact point.

Moreover, the object is solved by means of an automatic vehicle coupling system comprising a vehicle connection device according to the disclosure and a ground contact unit according to the disclosure.

To make it possible to always contact reliably, the maximum rotational angle, about which the aligning actuator can rotate the vehicle contact unit, can be at least as large as the largest angle between the primitive base vectors of the main lattice.

For optimal results, the base lattice and the main lattice correspond with each other substantially and/or the aligning actuator is connected to the base in such a way that it can rotate the base along the ground contact unit, in particular in the case of an existing contact between the contact electrodes and the contact surfaces.

In an embodiment of the disclosure, the magnetic elements of the vehicle contact unit interact with the contact magnets in order to fix the vehicle contact unit in position on the ground contact unit and to form the axis of rotation. In this way, the position of the axis of rotation in relation to the main lattice is always known.

Moreover, the object is solved by means of a method for automatically, conductively connecting a vehicle contact unit to a ground contact unit, comprising the following steps:
 a) lowering the vehicle contact unit towards the ground contact unit in a contact direction until the vehicle contact unit contacts the ground contact unit,
 b) checking whether at least one specific contact electrode of the vehicle contact unit contacts at least one corresponding specific contact area of the ground contact unit, and
 c) rotating the vehicle contact unit about an axis of rotation if no or insufficient electrical contact exists between said at least one specific vehicle-facing contact electrode and said at least one corresponding specific contact area.

The specific contact electrode and the specific contact area are each the same type, i.e. for example, a first contact electrode and a first contact area, an earthing contact electrode and an earthing contact area, a second contact electrode and a second contact area, a neutral electrode and a neutral contact area, a third contact electrode and a third contact area or a phase electrode and a phase contact area. The check as to whether the corresponding contact areas or contact electrodes are contacted with each other can take place by means of high-frequency signals that are transmitted via the contact points.

Whether said at least one specific contact electrode contact contacts said at least one corresponding contact area is preferably checked during rotation or after the rotation is completed, thereby enabling feedback on the success of the rotation quickly. For example, the direction of rotation is changed in the case of a failure.

For example, said at least one specific contact electrode is one or more of at least one first contact electrode and at least one specific contact area is one or more of at least one first contact area to always ensure that the connection established for charging has a functioning protective earth conductor.

In particular, the externally situated first contact electrodes or earthing contact electrodes are the specific contact electrodes, i.e. not those earthing contact electrodes located in the magnetic area.

Alternatively or additionally, the object is solved by means of a vehicle contact unit for a vehicle battery charging system for automatically, conductively connecting a ground contact unit and the vehicle contact unit having several first contact electrodes, which are electrically connected to each other via an electrical lead and form said at least one first vehicle subcircuit, and at least one second contact electrode. The vehicle contact unit also has a measuring unit and/or a signal source for high-frequency signals.

By means of the measuring unit and the signal source for high-frequency signals, a high-frequency signal can be transmitted via the contact points, i.e. of the connection of one of the contact electrodes of the vehicle contact unit to the corresponding contact area of the ground contact unit. The resulting high-frequency response can be measured by the measuring unit to check the contacting and its assignment. By using high-frequency signals, this check is independent of the charging current used and can also therefore occur during the charging process, in particular via the same contact electrodes and contact areas that are also used to transmit charging current.

From the formulation, according to which several contact electrodes form a ground subcircuit, such subcircuits are also to be included that initially form as a result of the contact surfaces contacting the contact electrodes of the vehicle contact unit. Here, the first and second contact electrodes can also be electrically connected to each other.

The vehicle contact unit is configured to be brought into physical contact with the ground contact unit correctly without the manual intervention of a person, i.e. it can be part of an automatic, conductive vehicle battery charging system. To this end, a conductive, i.e. galvanic, connection is generated by directly contacting the contact electrodes and the contact surfaces. This contrasts with inductive charging systems in which there is no direct contact.

Here, the signal source and/or the measuring unit can be connected to the first vehicle subcircuit. Moreover, the signal source and/or the measuring unit can also be used for transmitting data between the vehicle and the ground contact unit. Of course, the electrical lead can comprise at least an ohmic resistor, at least a capacity, such as a capacitor, and/or at least one inductor, such as a coil, as well as any arbitrary combination of these components, for example in order to couple signals in the subcircuit and/or then decouple signals from of the subcircuit.

For example, the first contact electrodes and the second contact electrodes are arranged in a pattern, in particular a base lattice in the form of a two-dimensional Bravais lattice. In this way, a specific and repeatable arrangement of the contact electrodes is possible on the base, thereby simplifying a contacting to the ground contact unit. The pattern extends over the entire contacting surface.

In a variant, several second contact electrodes are provided, which are connected to each other electrically and form a second vehicle subcircuit, and/or the vehicle contact unit has several third contact electrodes, in particular wherein the third contact electrodes are electrically connected to each other and form a third vehicle subcircuit. In this way, two or three different types of contact electrodes or contact points can be checked for contacting or correct assignment.

Preferably, the characteristic impedance of the first vehicle subcircuit is different, in particular larger than the characteristic impedance of the second vehicle subcircuit and/or the third vehicle subcircuit. As a result, high-frequency signals are attenuated differently, in particular more powerfully, in the first vehicle subcircuit. In this way, it can be determined whether the first vehicle subcircuit is in the circuit subject to the high-frequency signal.

At least one contact magnet can be provided for locking the vehicle contact unit onto the ground contact unit.

In an embodiment of the disclosure, the first contact electrodes are earthing contact electrodes and the second contact electrodes are neutral electrodes or phase electrodes to enable a reliable assignment of the earthing contact electrodes and thus the protective earth conductor.

It is also conceivable that the first contact electrodes are connected to the negative terminal and the second contact electrodes to the positive terminal of a direct-current network of the vehicle or the battery of the vehicle, or vice versa.

The second contact electrodes can be exclusively neutral electrodes or exclusively phase electrodes. If third contact electrodes are present, these are either phase electrodes or neutral electrodes so that all three types of contact electrodes are present. In this way, an electrical contact with the protective earth conductors can be established reliably. In particular, the function of the neutral electrodes and the phase electrodes cannot be interchanged.

In an embodiment of the disclosure, the first contact electrodes, the second contact electrodes and/or the third contact electrodes are located rotationally symmetrically about a symmetry axis parallel to the longitudinal extension of at least one of the contact electrodes, thereby making it possible to easily move the contact electrodes automatically to the correct contact areas.

The symmetry axis runs, for example, through one of the electrodes, through the magnetic area and/or through the centre point of the contacting area. As a result, the entire vehicle contact unit can be rotationally symmetric and, for example, have no asymmetric guides.

Alternatively or additionally, the object is solved by means of a ground contact unit for a vehicle battery charging system for automatically, conductively connecting the ground contact unit and the vehicle contact unit, comprising a target surface that has several first contact areas each with at least one first contact surface as well as has at least a second contact area each with at least a second contact surface, wherein the first contact surfaces are electrically connected to each other via an electrical lead and form at least one first ground subcircuit. The ground contact unit also has a measuring unit and/or a signal source for high-frequency signals.

By means of the measuring unit and the signal source for high-frequency signals, a high-frequency signal can be transmitted via the contact points, i.e. of the connection of one of the contact electrodes of the vehicle contact unit with the corresponding contact area of the ground contact unit. The resulting high-frequency response can be measured by the measuring unit in order to check the contacting and its assignment. By using high-frequency signals, this check is independent of the charging current used and can therefore also take place during the charging process, in particular via the same contact electrodes and contact areas that are also used to transmit charging current.

For example, the subcircuits are also first formed as a result of the contacting of the contact surfaces with the contact electrodes. Here, the first and second contact areas can be connected to each other electrically.

The ground contact unit is configured to be brought into physical contact with a vehicle contact unit correctly without the manual intervention of a person, i.e. it can be part of an automatic, conductive vehicle battery charging system.

Here, the signal source and/or the measuring unit can be connected to the first ground subcircuit. Moreover, the signal source and/or the measuring unit can also be used for transmitting data between the vehicle and the ground contact unit. Of course, the electrical lead can comprise at least one ohmic resistor, at least one capacity such as a capacitor and/or at least one inductor such as a coil as well as any arbitrary combination of these components.

For example, the first contact areas and the second contact areas are arranged in a main pattern, in particular a main lattice in the form of a two-dimensional Bravais lattice. The first contact areas are arranged in a first subpattern, in particular a first sublattice in the form of a two-dimensional Bravais lattice, and the second contact areas are arranged in a second subpattern, in particular a subpattern in the form of a two-dimensional Bravais lattice, wherein the first subpattern and the second subpattern are interlaced with each other.

By arranged the contact surfaces in a pattern, in particular a lattice, it is no longer necessary to position the contacting areas of the vehicle contact unit on the target surface of the ground contact unit exactly as long as the contacting area is within the main lattice. By exploiting the symmetry of the main lattice and owing to the interlacing arrangement of the sublattices, a correct assignment of the contact electrodes of the vehicle contact unit to the corresponding contact areas or contact surfaces of the ground contact unit can be achieved by rotating the vehicle contact unit.

The main pattern and the subpattern extend over the entire target surface.

In a variant, several second contact areas are provided, wherein the second contact surfaces are electrically connected to each other and form a second ground subcircuit and/or the ground contact unit has several third contact areas, in particular wherein the third contact areas are electrically connected to each other and form a third ground subcircuit. In this way, two or three different types of contact electrodes or contact points can be checked for contacting or correct assignment.

Preferably, the characteristic impedance of the first ground subcircuit is different, in particular larger than the characteristic impedance of the ground vehicle subcircuit and/or the third ground subcircuit. As a result, high-frequency signals are attenuated differently, in particular more powerfully, in the first ground subcircuit. In this way, it can be determined whether the first ground subcircuit is in the circuit subject to the high-frequency signal.

To increase the characteristic impedance of the first ground subcircuit, several of the first contact surfaces have a resistance element that increases the characteristic impedance of the electrical lead assigned to the respective contact surface.

Preferably, the resistance elements each encompass the electrical lead and/or is made of a ferrite, in particular a ferrite core. In particular, the majority of the first contact surfaces comprise a resistance element.

In an embodiment of the disclosure, the first contact areas are earthing contact areas and the second contact areas are neutral contact areas or phase contact areas in order to enable a reliable assignment of the earthing contact areas and thus the protective earth conductor.

It is also conceivable that the first contact areas are connected to the negative terminal and the second contact areas to the positive terminal of a direct-current network or a direct-current source, or vice versa.

The second contact areas can be exclusively neutral contact areas or exclusively phase contact areas. If third contact areas are present, these are either phase contact areas or neutral contact areas so that all three types of contact areas are present. In this way, an electric contact to the protective earth conductors can be established reliably. In particular, the function of the neutral contact areas and the phase contact areas cannot be interchanged.

In an embodiment of the disclosure, the first contact areas, the second contact areas and/or the third contact areas are located rotationally symmetrically about a symmetry axis perpendicular to the target surface, thereby making it possible to easily move the contact electrodes of the vehicle contact unit to the correct contact areas automatically.

The symmetry axis runs, for example, perpendicular to the target surface and/or one of the contact surfaces. As a result, the entire ground contact unit can be rotationally symmetric and, for example, has no asymmetric guides.

Alternatively or additionally, the object is solved by an automatic vehicle coupling system for conductively connecting a ground contact unit and a vehicle contact unit to a vehicle contact unit and a ground contact, wherein the vehicle contact unit and/or the ground contact unit have a measuring unit and a signal source for high-frequency signals.

Alternatively or additionally, the object is solved by a method for checking the contacting and assignment of contact points in an automatic vehicle coupling system, comprising the following steps:
a) establishing a physical contact between the contact electrodes of the vehicle contact unit and the contact surfaces of the ground contact unit so that at least one circuit is formed from the first ground subcircuit on the one hand and the first vehicle subcircuit on the other hand,
b) generating at least one high-frequency signal by the signal source,
c) supplying said at least one high-frequency signal to at least one circuit formed,
d) measuring by the measuring unit of a high-frequency response of said at least one circuit formed to said at least one high-frequency signal, and
e) establishing as to whether the first contact electrode is in contact with the first contact surface with the help of the measured high-frequency response.

In this regard, the correct contacting and assignment are assumed, for example, if the high-frequency response corresponds with a reference response that can also be an area. In the case of three different contact electrodes or contact surfaces, the circuits can, for example, consist of the first subcircuit, the second subcircuit and the third subcircuit, thereby making six different circuits theoretically possible.

The check of the contacting and assignment of the contact points is based on the fundamental idea that said at least one circuit results in a characteristic high-frequency response so that the measurement of the high-frequency response and the analysis of the high-frequency response provide information about which circuit was formed and measured, more specifically of which two subcircuits the measured circuit consists. Through the knowledge of the two subcircuits, it can then be determined which contact electrodes are in contact with which contact areas or contact surfaces, thereby enabling the assignment of the contact points to be checked. Even the case that a closed circuit is not formed can be established.

Preferably, the several second contact electrodes of the vehicle contact unit are electrically connected to each other and form a second vehicle subcircuit or the second contact surfaces of the ground contact unit are electrically connected to each other and form a second ground subcircuit, wherein said at least one circuit is formed from the first ground subcircuit and the second ground subcircuit on the one hand and the first vehicle subcircuit and/or the second vehicle subcircuit on the other hand. Whether the first contact electrodes or the second contact electrodes are in contact with the first contact surfaces or the second contact surfaces is determined with the help of the measured high-frequency response. In this way, different circuits can be recognised from different subcircuits.

For example, the high-frequency signal and/or the high-frequency response are generated or measured in the vehicle contact unit and/or the high-frequency signal and/or the high-frequency response are generated or measured in the ground contact unit, thereby meaning both the vehicle contact unit and ground contact unit are capable of checking the contacting and the assignment.

To achieve as much reliability as possible when checking the contacting and the assignment of contact points, said at least one high-frequency signal and/or the corresponding high-frequency response are generated and measured in one of the vehicle subcircuits, in particular the first vehicle subcircuit, and/or said at least one high-frequency signal and/or the corresponding high-frequency response are generated and measured in one of the ground subcircuits, in particular the first ground subcircuit.

For example, the attenuation of the high-frequency response is determined in the circuit and whether the first contact electrodes are in contact with the first contact surfaces, the second contact surfaces or no contact surface is established with help from the attenuation determined.

Here, each of the subcircuits can have a different characteristic impedance. In particular, the earthing contact areas have a higher characteristic impedance and thus higher attenuation as the phase contact areas and the neutral contact areas. Accordingly, the subcircuits containing earthing contact areas have a greater attenuation.

In an embodiment of the disclosure, after it has been established that the first contact electrodes are in contact with the first contact surfaces, data is transmitted by means of a signal source to the measuring unit, thereby enabling data transmission between the vehicle and the rest of the vehicle battery charging system. The data can be transmitted via the same lead or the same contact points as the charging current.

For example, after it has been established that the first contact electrodes are in contact with the first contact surfaces, it is checked continually or at regular intervals by means of the signal source and the measuring unit as to whether the contact still exists between the first contact electrodes and the first contact surfaces. If the contact is interrupted, an emergency function is activated. In this way, it is possible to react to unforeseen circumstances, such as any unplanned movement of the vehicle. For example, the emergency function switches off of the charging current.

BRIEF DESCRIPTION OF THE DRAWINGS

Additional features and advantages of the disclosure are found in the following description as well as the attached drawings to which reference is made. In the drawings.

DETAILED DESCRIPTION

Figure 1:
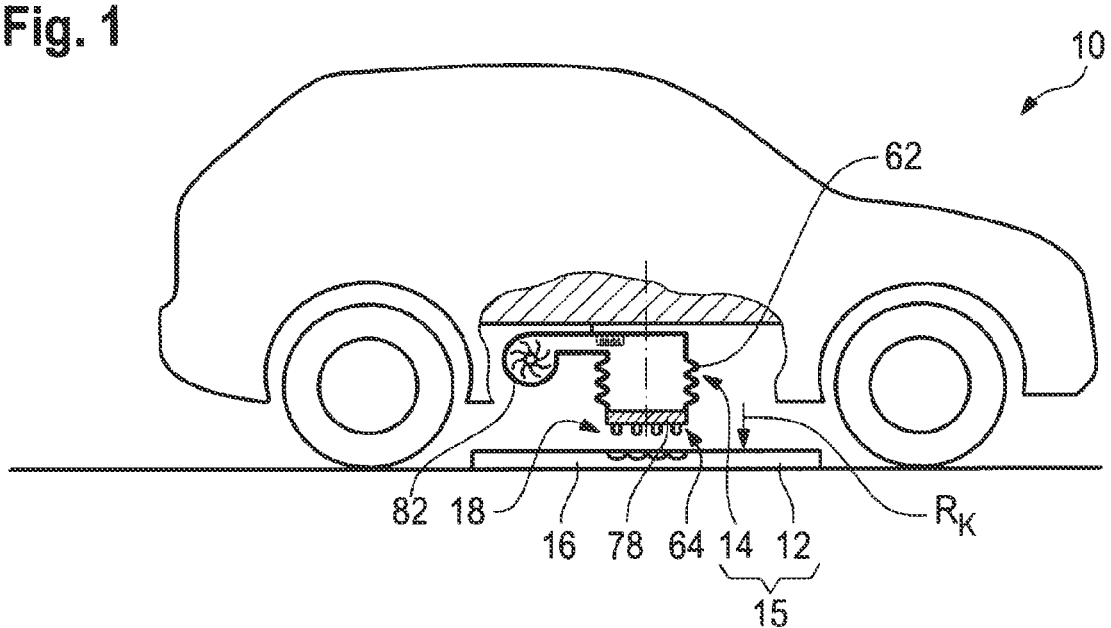
FIG. 1 schematically shows a vehicle coupling system according to the disclosure comprising a vehicle connection device according to the disclosure and ground contact unit according to the disclosure.

A vehicle 10 is shown in FIG. 1, for example a battery-powered vehicle or a plug-in hybrid vehicle, which is parked on or above a ground contact unit 12 in order to charge the battery.

A vehicle connection device 14 that can electrically connect the vehicle 10 to the ground contact unit 12 is mounted on the underbody of the vehicle 10.

The ground contact unit 12 and the vehicle connection device 14 are part of an automatic vehicle coupling system 15 that is in turn part of a vehicle battery charging system.

Figure 2A:
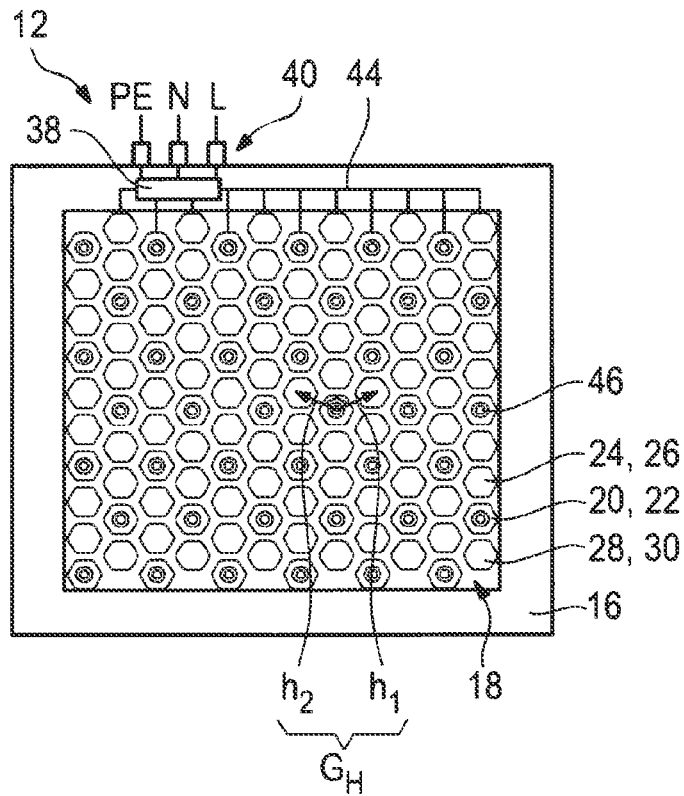
FIG. 2A shows a top view of the ground contact unit according to the disclosure according to FIG. 1.

In FIG. 2A, the ground contact unit 12 is shown in top view.

The ground contact unit 12 has a plate-like base body 16 on whose upper side a target surface 18 is provided.

Several different contact areas are provided in the target surface 18.

In the shown embodiment, first contact areas 20 that are, for example, earthing contact areas 22, second contact areas 24 that are, for example, neutral contact areas 26 as well as third contact areas 28 that are, for example, phase contact areas 30 are provided so that the ground contact unit 12 is configured for example for charging the vehicle 10 by means of alternating current.

The term "neutral contact area" is a short form of "neutral conductor contact area".

It is also however conceivable that the vehicle 10 is to be charged by direct current. To this end, the second contact area 24 can be a positive direct-current contact area and the third contact area 28 can be a negative direct-current contact area, or vice versa.

The contact areas 20, 24, 28 and 22, 26, 30 each comprise at least one contact surface. Thus, each of the first contact areas 20 has a first contact surface, each of the second contact areas 24 has a second contact surface and each of the third contact areas 28 has a third contact surface.

It is however conceivable that each of the contact areas 20, 24, 28 and 22, 26, comprise several contact surfaces.

The contact areas 20, 24, 28 and 22, 26, 30 are each closed surfaces with a hexagonal, in particular regular hexagonal, or circular contour. Optionally, the corners of the hexagon may have a radius.

The contact areas 20, 24, 28 and 22, 26, 30 and/or the contact surfaces can be in a plane, for example, the target surface 18 is this plane.

The contact areas 20, 24, 28 and 22, 26, 30 are arranged in a main pattern. The main pattern is a two-dimensional Bravais lattice, more specifically a hexagonal lattice, in the shown embodiment. The main pattern is thus a main lattice $G_H$ with two base vectors $h_1$, $h_2$ with the same length which form together an angle of 120°.

The main pattern and the main lattice $G_H$ extend over the entire target surface 16.

The ground contact unit 12 has a ground control unit 38 which is electrically connected to at least each of the contact areas 24, 28 or 26, 30 in particular with all contact areas 20, 24, 28 and 22, 26, 30.

Moreover, the ground contact unit 12 has three ground connections 40, namely a first ground connection 40.1, a second ground connection 40.2 and a third ground connection 40.3 which are connected to the corresponding connections of the local electricity network (not shown) at the location of the ground contact unit 12.

As will be explained in detail later, the first contact areas 20 or the earthing contact areas 22 are connected via the first ground connection 40.1 to the protective earth conductor of the electricity network, the second contact areas 24 or neutral contact areas 26 are electrically connected via the second ground connection 40.2 to the neutral conductor of the electricity network and the third contact areas 28 or phase contact areas 30 are electrically connected via the third ground connection 40.3 to the phase conductor or the live conductor of the electricity network.

In the case of direct-current charging, the positive and negative direct-current contact areas are connected via the second or third ground connections 40.2, 40.3 to the positive or negative pole of a direct-current source for the purpose of charging.

Only the terms earthing contact areas 22, neutral contact areas 26 and phase contact areas are used for simplification hereinafter, wherein these are understood to also mean the first contact areas 20, the second contact areas 24 and the third contact areas 28.

Figure 2B:
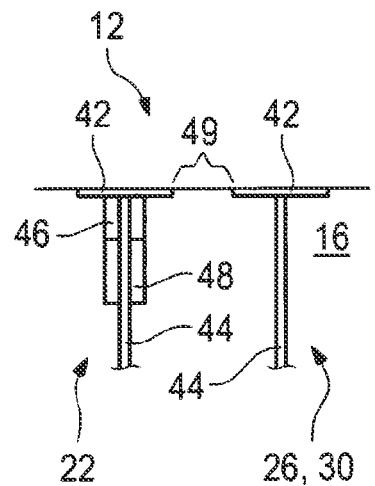
FIG. 2B shows a sectional view through two adjacent contact electrodes of the ground contact unit according to FIG. 1, FIG. 3 schematically shows the configuration of the different contact areas and ground contact unit's cabling or wiring of these according to FIGS. 2A-2B.

As shown in FIG. 2B, the earthing contact areas 22 (shown on the left) are designed differently from the neutral contact areas 26 and the phase contact areas (shown as an example together on the right).

The neutral contact areas 26 and the phase contact areas 30 have a flat contact plate 42 as well as an electrical lead 44. The contact plate 42 is, for example, hexagonal and forms the contact surface. The electrical lead 44 extends from the contact plate 42 through the base body 14 via the ground control unit 38 to the power connections 40.

In addition to the contact plate 42 and the electrical lead 44, the majority, in particular all of the earthing contact areas 22 have a magnetic element 46.

In the shown embodiment, the magnetic element 46 is a ferromagnetic element in the form of a steel cylinder that encompasses the electrical lead 44. This means that the electrical lead 44 extends through the magnetic element 46.

Moreover, a resistance element 48 which also encompasses the electrical lead 44 is provided between the magnetic element 46 and the contact plate 42 and/or on the side of the magnetic element 46 facing away from the contact plate 42.

The resistance element 48 acts as inductor and increases the characteristic impedance of the electrical lead 44 for high-frequency signals. For example, it is made of, inter alia, a ferrite.

It is also conceivable that the magnetic element 46 and the resistance element 48 are designed as an integral component made of a material which is magnetic as well as increases the characteristic impedance.

The magnetic element 46 and the resistance element 48 are both provided in the base body 16.

The contact plates 42 of adjacent contact areas 22, 26, 30 are separated from each other by an insulating section 49 or several insulating sections 49.

Figure 3:
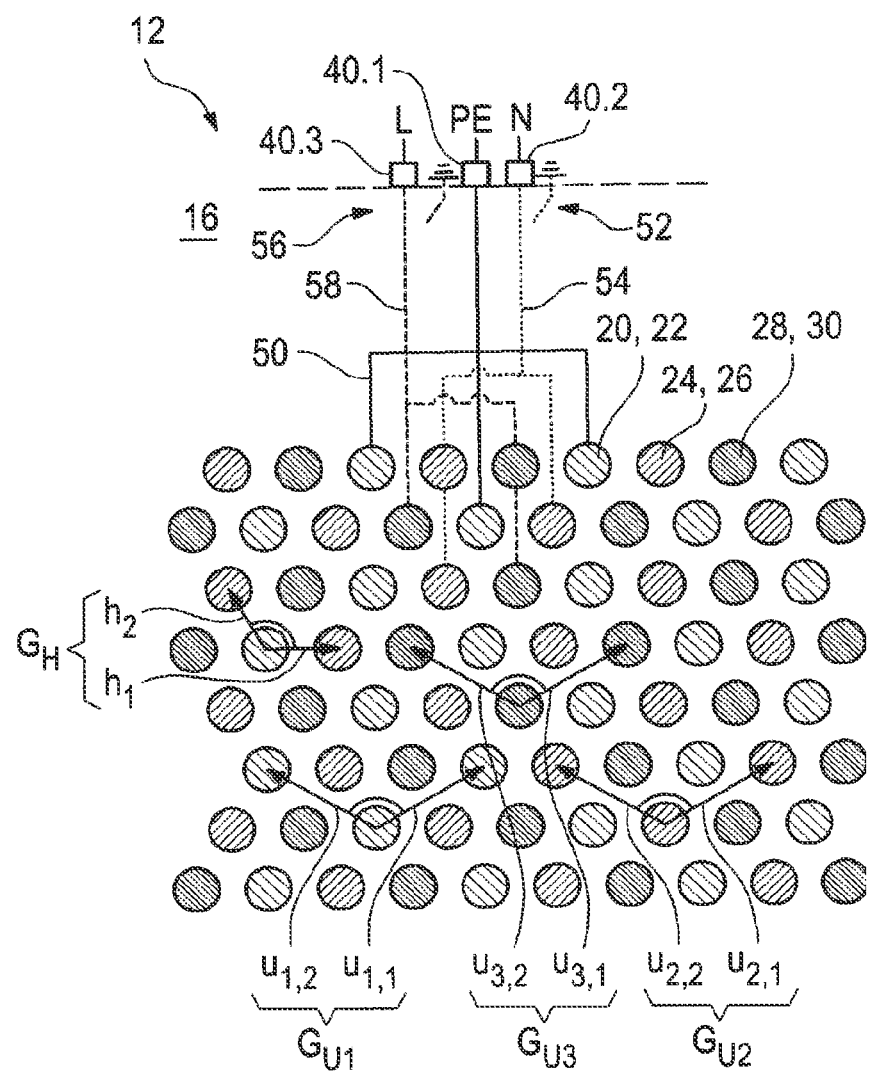

In FIG. 3, the main lattice $G_H$ from the contact areas 20, 24, 28 and 22, 26, is shown in part and the cabling is indicated schematically. For the purpose of simplification, the contact areas 20, 24, 28 and 22, 26, 30 are represented as circles.

The circuit drawing drawn in FIG. 3 is merely for illustrative purposes and is mainly connected by the ground control unit 38.

The earthing contact areas 22, neutral contact areas 26 and the phase contact areas 30 are each arranged in their own subpattern, in this case each in the form of a two-dimensional Bravais lattice, thus a sublattice.

The earthing contact areas 22 are arranged in a first sublattice $G_{U1}$ with the base vectors $u_{1,1}$, $u_{1,2}$. The first sublattice $G_{U1}$ is also a hexagonal lattice so that the two base vectors $u_{1,1}$ and $u_{1,2}$ have the same value and form an angle of 120° with each other.

Similarly, the neutral contact areas 26 are arranged in a second sublattice $G_{U2}$ with the base vectors $u_{2,1}$, $u_{2,2}$ that also have the same value and form an angle of 120° with each other.

The phase contact areas 30 are on a hexagonal third sublattice $G_{U3}$ with the base vectors $u_{3,1}$, $u_{3,2}$ that are the same length and form an angle of 120°.

The three sublattices $G_{U1}$, $G_{U2}$, $G_{U3}$ are arranged interlaced with each other so that the three different contact areas 22, 26, 30 occur alternately along the direction of one of the base vectors $h_1$, $h_2$ of the main lattice $G_H$ continuously.

In other words, the contact areas 26, 28, 22 that are most closely adjacent to whichever contact area 22, 26, 30 is being regarded are always a different type than that of the contact area 22, 26, 30 being regarded.

The contact areas 22, 26, 30 or the contact surfaces are thus arranged rotationally symmetric about an axis of rotation perpendicular to the target surface 18. The entire ground contact unit 12 can also be designed rotationally symmetric, i.e. at least the visible parts that are required for connecting to the vehicle connection device 14 are configured rotationally symmetrically.

The earthing contact areas 22 are all connected to each other by means of the electrical leads 44, wherein only three earthing contact areas 22 are shown connected for the sake of clarity in FIG. 3.

Moreover, the earthing contact areas 22 are connected via one of the power connections 40 to the protective earth conductor of the electricity network, referred to here as PE.

It is conceivable that that ground control unit 38 is only capable of electrically connecting individual contact areas of the earthing contact areas 22 to the first ground connection 40.1.

All or some of the earthing contact areas 22—thus the earthing contact areas 22 electrically connected to each other—can thus form a subcircuit that is referred to as the first ground subcircuit 50 hereinafter.

The neutral contact areas 26 are also connected via the electrical leads 44 to the second ground connection 40.2 and the neutral conductor (N) of the electricity network.

The connection is carried out via the ground control unit 38 which can specifically only connect individual contact areas of the neutral contact areas 26 to the second ground connection 40.2.

Moreover, by means of the ground control unit 38, specific or all neutral contact areas 26 can be earthed, be connected to the neutral conductor, be connected to each other or short-circuited, or be set to the potential of the protective earthing, thus connecting to the first ground connection 40.1. This is indicated here by a first switch 52 that earths the neutral contact areas 26.

At least if all or some of the neutral contact areas 26 are earthed, but even if all or some of the neutral contact areas 26 are connected to the neutral conductor, connected to each other or short-circuited, or set to the potential of the protective earthing, they are electrically connected to each other and may form a second subcircuit, which is referred to as the second ground subcircuit 54 hereinafter.

In the same way as the neutral contact areas 26, the phase contact areas 30 contact the third ground connection 40.3 that is connected to the phase conductor of the electricity network, here referred to as L.

This connection is also made via the electrical leads 44 by the ground control unit 38, which can selectively only connect individual contact areas of the phase contact areas 30 to the corresponding third ground connection 40.3.

By means of the ground control unit 38, all or only some of the phase contact areas 30 can earthed, be connected to the live conductor, be connected to each other or short-circuited or be set to the potential of the protective earthing, thus connecting to the first ground connection 40.1. This is indicated in FIG. 3 by a second switch 56 which earths the phase contact areas 30.

At least if some or all of the phase contact areas 30 are earthed or connected to the protective earthing potential, but also if all or some of the phase contact areas 30 are connected to the live conductor or are connected to each other or short-circuited, these phase contact areas 30 can form a further subcircuit via the electrical lead 44, said subcircuit being referred to as the third subcircuit 58 hereinafter.

The electrical connection or the short circuit of the contact areas 20, 24, 28 and 22, 26, 30 to each other is preferably provided in the ground contact unit 10 itself.

Owing to the resistance element 48 encompassing the electrical leads 44 of the earthing contact areas 22, the characteristic impedance of the first ground subcircuit 50 increases in relation to the second ground subcircuit 54 and the third subcircuit 58 for high frequency signals.

A high-frequency signal is understood to mean a signal with a frequency equal to or larger than 10 Hz, in particular equal to or larger than 1 kHz, in particular equal to or larger than 200 kHz.

Figure 4:
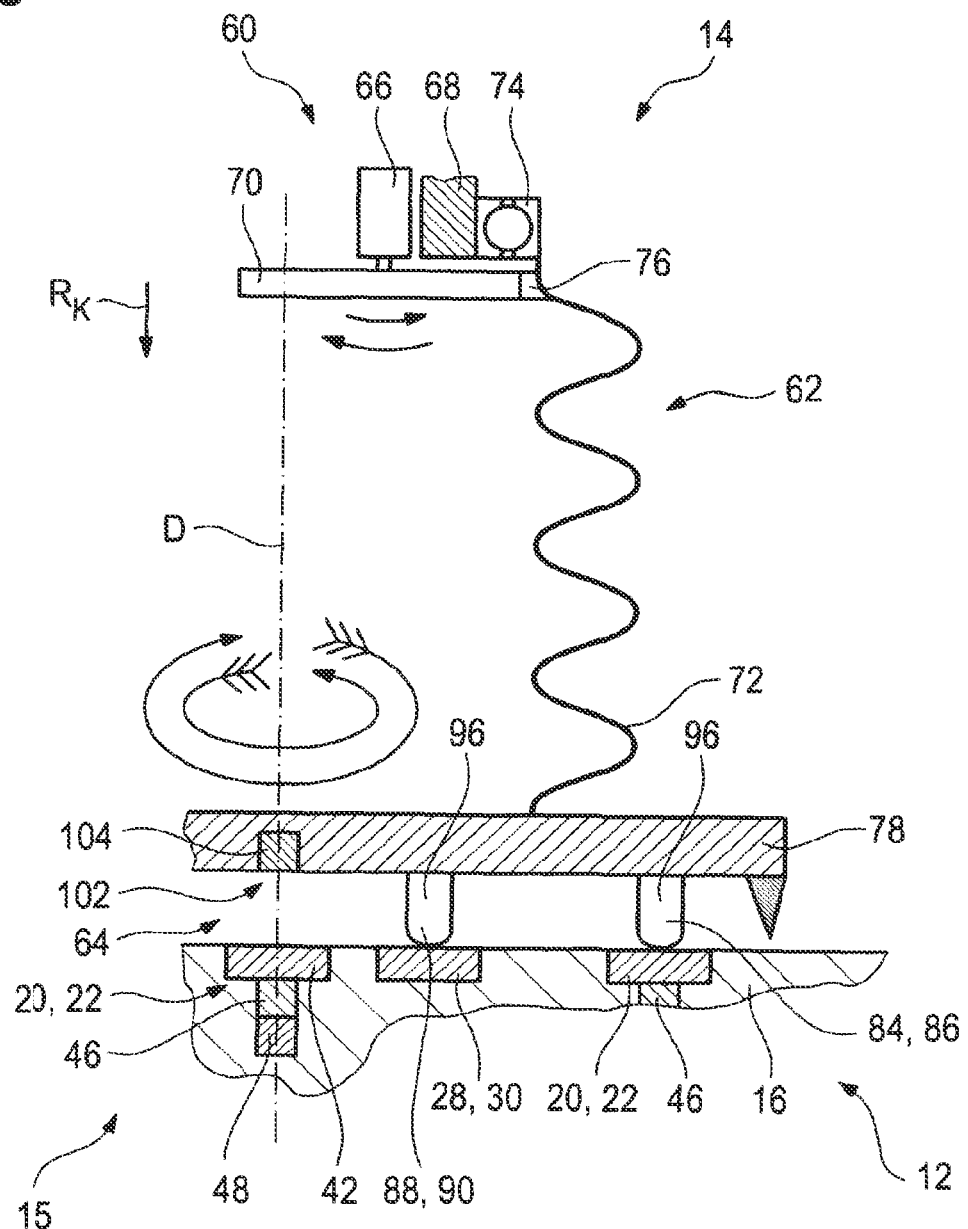
FIG. 4 shows a very simplified, partial sectional view of the vehicle connection device according to FIG. 1.

The vehicle connection device 14 is shown in a possible embodiment as an example in FIGS. 1 and 4.

The vehicle connection device 14 comprises an aligning actuator 60, a contacting actuator 62 as well as a vehicle contact unit 64.

In the shown example, the aligning actuator 60 has an electric motor 66, a mounting section 68 and a gear 70.

The electric motor 66 is attached to the mounting section 68 in a rotationally fixed manner, wherein the mounting section 68 may in turn be mounted on the vehicle 10 itself, z. B. the vehicle body.

It is also conceivable that the electric motor 66 is mounted directly on the vehicle 10. In this case, no mounting section 68 is necessary.

The gear 70 can be driven via the output shaft of the electric motor 66.

In the shown embodiment, the contacting actuator 62 includes a bellows 72 comprising a vehicle-facing end and a base end.

The contacting actuator 62 is mounted rotatably on the mounting section 68 by means of a bearing 74 on the vehicle-facing end of the bellows 72. Moreover, the bellows 72 comprise teeth 76 on its interior side which are engaged with the gear. A belt drive or a screw drive, for example, would also be possible instead of the pair of gears 70 and 76.

A vehicle contact unit 64 is provided on the base end of the bellows 72. More specifically, a base 78 of the vehicle contact unit 64 is attached on the base end of the bellows 72.

In the shown intended assembly position, the base 78 is parallel to the ground and to the ground contact unit 12.

The vehicle contact unit 64 can be moved by the contacting actuator 62 in the vertical direction, i.e. perpendicular to the base 78 and to the ground contact unit 12. The vertical direction is therefore referred to as the contact direction $R_K$. A combination or mechanical coupling of the aligning actuator 60 and the contacting actuator 62 is also conceivable.

The bellows 72 are inflated by compressed air source 82 in order to move the vehicle contact unit 64 in the direction of the ground contact unit 12.

The bellows 72 can be contacted when the compressed air source 82 is deactivated by means of a return mechanism, such as springs, ropes, etc. within the bellows (not shown), thereby enabling the vehicle contact unit 64 to be moved upwards, i.e. counter to the contact direction $R_K$.

It is also conceivable that the contacting actuator 62 is a piston cylinder unit that can execute the vertical movement in the contact direction $R_K$ of the vehicle contact unit 14.

The aligning actuator 60 can then rotate the vehicle contact unit 64 or the base 78 about an axis of rotation D (see FIG. 4) in order to align precisely. To this end, the electric motor 66 is activated which subsequently generates torque on the gear 70. The torque is transmitted via the teeth 76 to the bellows which then rotate relative to the mounting section 68.

As the base 78 is connected in a rotationally fixed manner to the bellows 72, the base 78 and thus the vehicle contact unit 64 are rotated about the axis of rotation D by the aligning actuator 60.

Figure 5:
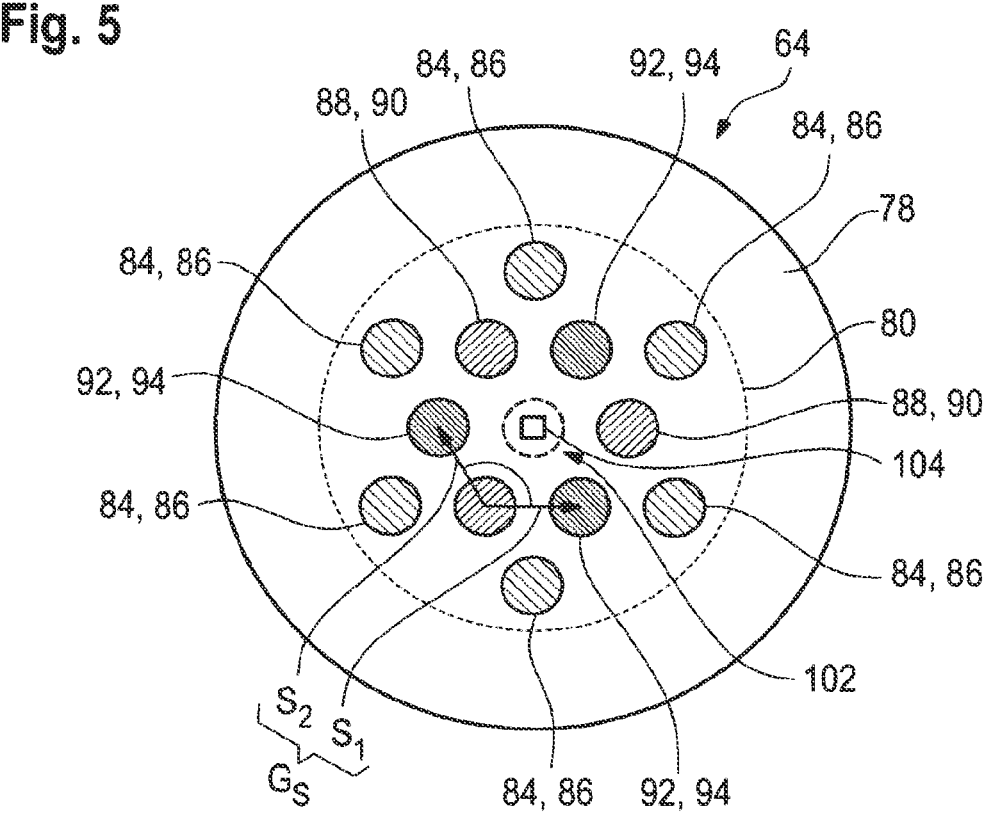
FIG. 5 shows a schematic bottom view of the vehicle connection device according to FIG. 1, FIG. 6 schematically shows the configuration of the contact electrodes and vehicle connection device's cabling or wiring of these according to FIG. 5.

In FIG. 5, a bottom view of the base 78 is shown.

On the side facing away from contacting actuator 62 and the aligning actuator 60, i.e. the contact side, the vehicle contact unit 64 comprises a contacting area 80, in which several contact electrodes 84, 88, 92 and 86, 90, 94 are provided for contacting the contact surfaces of the ground contact unit 12.

The first contact electrodes 84 that are earthing contact electrodes 86 in the shown embodiment, second contact electrodes 88 that are neutral electrodes 90 in the shown embodiment and third contact electrodes 92 that are phase electrodes 94 in the shown embodiment are provided within the contacting area 80 so that the vehicle contact unit 64 is set up, for example, to charge the vehicle 10 by means of alternating current.

It is also however conceivable that the vehicle 10 is to be charged by direct current. To this end, the second contact electrode 88 can be a positive direct-current electrode and the third contact electrode 92 can be a negative direct-current electrode.

In particular, the functions of the neutral electrodes 90 and the phase electrodes 94 and the positive and negative direct-current contact electrodes are not interchangeable.

Analogous to the contact areas 20, 24, 28 and 22, 26, 30, the contact electrodes 84, 88, 92 and 86, 90, 94 are arranged in a base pattern, thus here in the form of a two-dimensional Bravais lattice, more specifically a hexagonal lattice. The base pattern is therefore termed base lattice $G_S$ hereinafter and has the base vectors $s_1$, $s_2$, that are the same length and form together an angle of 120°. The base lattice $G_S$ substantially corresponds to the main lattice $G_H$.

Moreover, one the lattice points of the base lattice $G_S$ can be in the centre point of contacting area 80.

The contact electrodes 84, 88, 92 and 86, 90, 94 are formed by contact pins 98 (FIG. 4) which extend perpendicular from the base 78, said contact pins 98 being supported resiliently relative to the base 78.

The contact pins 98 are connected via the electrical leads 98 to an on-board power supply (not shown) of the vehicle 10.

The first contact electrodes 84 or earthing contact electrodes 86 are connected to the earthing contact conductor of the on-board power supply, the second contact electrodes 88 or the neutral electrodes 90 are connected to the neutral conductor of the on-board power supply and the third contact electrodes 92 or phase electrodes 94 are connected to the phase conductor of the on-board power supply of the vehicle 10.

In the case of direct-current charging, the positive and negative direct-current electrodes are connected to the positive and negative poles of the battery of the vehicle 10 in order to charge.

For the sake of simplicity, reference is only made to the earthing contact electrodes 86, the neutral electrodes 90 and the phase electrodes 94 hereinafter, by which the first contact electrodes 84, the second contact electrodes 88 and the third contact electrodes 92 are meant equally.

Figure 6:
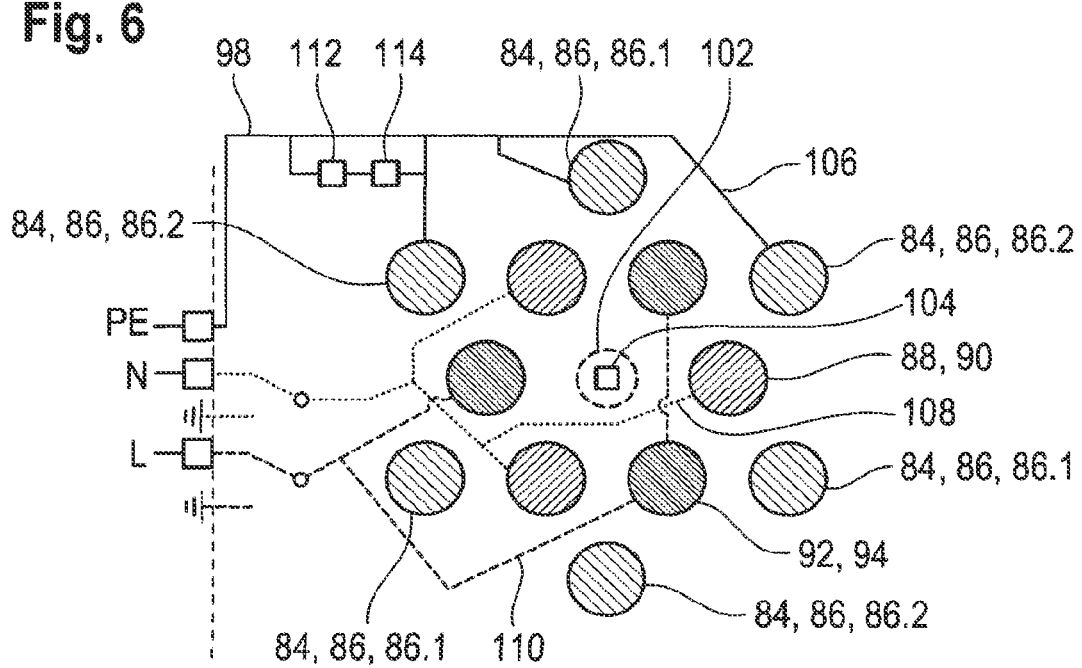

The connection can occur via a control unit 100 of the vehicle connection device 14 which connects the individual contact electrodes 86, 90, 94. The control unit 100 is only shown in FIGS. 7B, 8B and 9B for the sake of clarity. In FIG. 6, the control unit 100 is indicated by the switch that illustrates the function of the control unit 100.

The contacting area 80 has a magnetic area 102 in its centre point.

A contact magnet 104 is provided in the magnetic area 104 in or on the base 78, said contact magnet 104 being situated on one of the lattice points of the base lattice $G_S$.

The contact magnet 104 is for example an electromagnet that can be switched on and off. However, the contact magnet 104 can also be switchable in relation to the magnetic element 46 of the ground contact unit 12 in another way, for example by means of corresponding movements.

The contact electrode is not present in the magnetic area 102 in the shown embodiment.

Of course, an earthing contact electrode 86 can also be provided in the magnetic area 102, wherein the contact magnet 104 is assigned to the earthing contact electrode 86. It is however also conceivable that another contact electrode is provided in the magnetic area 102.

As particularly recognisable in FIG. 6, the remaining contact electrodes 86, 90, 94 are located in relation to the lattice point within the magnetic area 102.

The ones neighbouring the magnetic area 102 the closest, i.e. those lattice points or contact electrodes 90, 94 on the lattice points with the smallest distance to the magnetic area 102, are neutral electrodes 90 and phase electrodes 94 that are arranged alternately.

The second closest ones neighbouring the magnetic area 102, i.e. those lattice points or contact electrodes 86 with the second smallest distance to the magnetic area 102, are earthing contact electrodes 86.

The earthing contact electrodes 86 do not comprise magnets or can partially comprise magnets.

Thus, six earthing contact electrodes 86, three neutral electrodes 90 as well as three phase electrodes 94 are provided in the shown embodiment. Only three earthing contact electrodes 86, three neutral electrodes 90 and three phase electrodes 94 are also conceivable.

The contact electrodes 86, 90, 94 are thus located rotationally symmetrically about a symmetry axis perpendicular to the contact side or parallel to the longitudinal extension of one of the contact electrodes 86, 90, 94. The symmetry axis runs for example through the magnetic area 102 and/or the centre point of the contacting area 80.

The entire vehicle contact unit 64 can also be designed rotationally symmetric, i.e. at least the visible parts required for connecting to ground contact unit 12 are arranged rotationally symmetrically.

Similar to FIG. 3, the cabling of the contact electrodes 86, 90, 94 is indicated schematically in FIG. 6. This occurs, for example, via the control unit 100 of the vehicle connection device 14.

The earthing contact electrodes 86 are connected to a protective earth conductor (PE) of the on-board power supply of the vehicle 10 via at least one electrical lead 98. They can thus form a subcircuit that is referred to as the first vehicle subcircuit 106 hereinafter.

Similar to the neutral contact areas, all or some of the neutral electrodes 90 are electrically connected via the control unit 100 of the vehicle connection device 14 either to the neutral conductor (N) of the on-board power supply of the vehicle 10, or electrically connected to each other or short circuited independently of the control unit 100, or connected or earthed on the vehicle side to no further circuit or parts of the vehicle 10, or connected to the protective earth conductor of the on-board power supply of the vehicle 10.

The control unit 100 of the vehicle connection device 14 can change the electrical connection of the neutral electrodes 90, in particular electrically connect or short-circuit some or all neutral electrodes to each other. The neutral electrodes 90 can also be electrically connected to each other permanently independently of the control unit 100. At least in the earthed state, but also if all or some of the neutral contact electrodes 90 are connected to the neutral conductor, connected to each other or short circuited or set to the potential of the protective earthing, the neutral electrodes 90 form together a subcircuit via their assigned electrical leads 98, said subcircuit being referred to as the second vehicle subcircuit 108 hereinafter.

For example, a connecting lead in the base 78 can connect or short-circuit the neutral electrodes to each other to form a second vehicle subcircuit 108. Such a connecting lead in the base 78 is for example shown in the FIGS. 10 and 14A-14D.

In the same way, the phase electrodes 94 are connected via electrical leads 98 to a live conductor of the on-board power supply of the vehicle 10, electrically connected to each other or short circuited, connected on the vehicle side to no further circuit or parts of the vehicle 10 or connected to the protective earthing potential. This connection can also be changed by the control unit 100 of the vehicle connection device 14. The phase electrodes 94 connected electrically to each other can also form a subcircuit that is referred to as the third vehicle subcircuit 110 hereinafter.

It is also conceivable for the phase electrodes 94 that a permanent electrical connection exists between the phase electrodes 94 to form a third vehicle subcircuit 110. This is of course only then possible if only one phase is present such as in the case of single-phase alternating current charging or in the case of direct current charging.

This connection of the phase electrodes 94 to each other can also occur by means of a connecting lead in the base 78.

The electrical connection or the short circuit of the contact electrodes 88, 92 and 86, 90, 94 to each other that provides the corresponding subcircuit is provided, for example, in the vehicle contact unit 64 itself, in particular only in the base 78.

In the shown embodiment, the vehicle connection device 14 also comprises a signal source 112 for high-frequency signals as well as a measuring unit 114 for high-frequency signals that are connected to the first vehicle subcircuit 106.

To connect the vehicle 10 to the local electricity network, i.e. to produce an electrical connection between the vehicle contact unit 64 and the ground contact unit 12, the vehicle 10 with the vehicle connection device 14 is parked above the ground contact unit 12, as shown for example in FIG. 1.

After the vehicle 10 has been parked, the vehicle contact unit 64 is moved by the contacting actuator 62 in the contact direction $R_K$ towards the ground contact unit 12, i.e. lowered vertically and the magnet is switched on.

To this end, the bellows 72 of the contacting actuator 62 are inflated by the compressed air source 82 in the shown embodiment. While lowering, the vehicle contact unit 64 moves closer and closer to the ground contact unit 12 so that the contact magnet 104 in the centre of the vehicle contact unit 64 also comes to be in the proximity of the ground contact unit 12.

As soon as the contact magnet 104 is in the proximity of one of the magnetic elements 46, the magnetic element 46 and the contact magnet 104 attract.

Thus, a force is generated on the vehicle contact unit 64 comprising a very large part in the horizontal direction, i.e. perpendicular to the contact direction $R_K$, which aligns the magnet area 102, more precisely, the contact magnets 104 above a magnetic element 46.

Figure 7A:
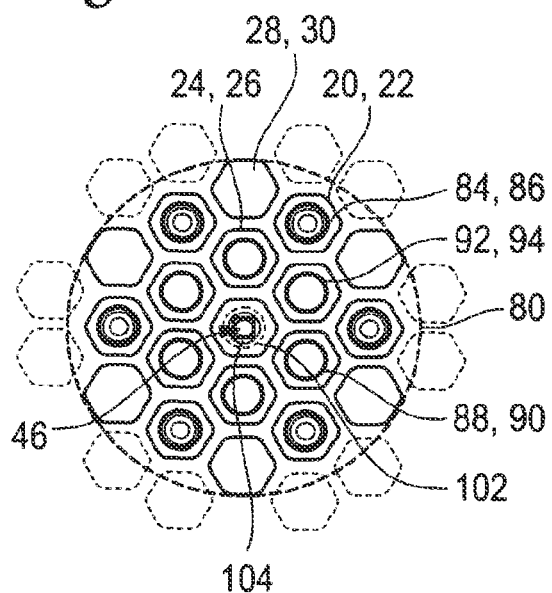
FIG. 7A shows the ground contact unit according to FIG. 1 in contact with the vehicle contact unit according to FIG. 1 in a correctly coupled position.
Figure 8A:
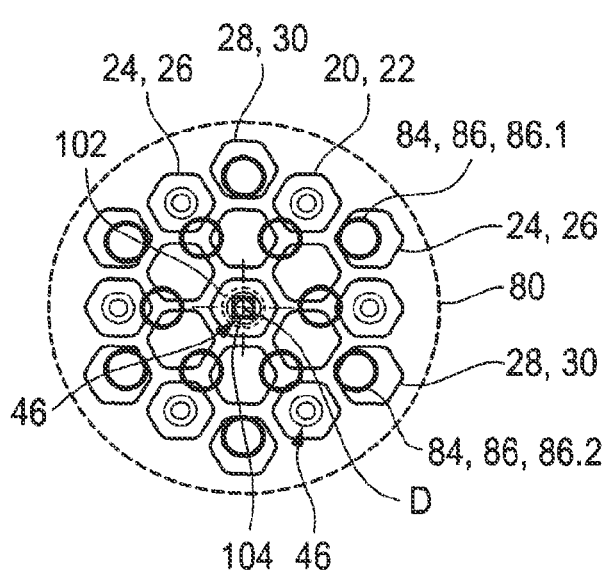
Figure 9A:
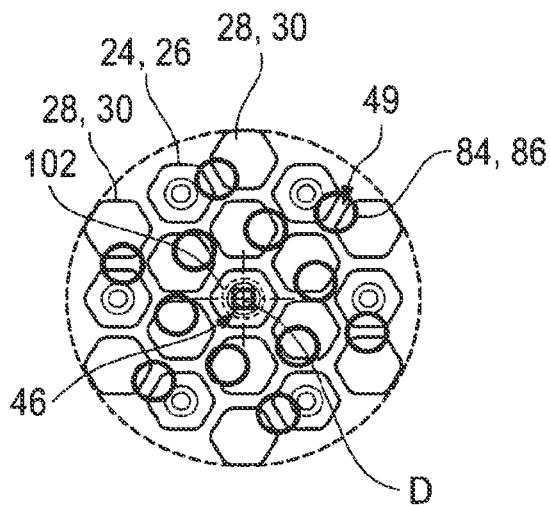

As the vehicle contact unit 64 is lowered further, the contact electrodes 86, 90, 94 physically contact the contact areas 22, 26, 30, as shown in FIGS. 7A, 8A and 9A as an example, wherein the contact electrodes 84 and 86 can be longer than the other contact electrodes 88, 92 and 90, 94, i.e. extend further away from the base 78, so that the contact electrodes 84 and 86 contact the ground contact unit first when lowering.

For example, the contact pins 96 of the contact electrodes 84 and 86 are designed longer than those of the other contact electrodes 88, 92 and 90, 94.

It is clearly evident that the contact magnet 104 or the magnetic area 102 is located centrally above the magnetic element 46 of an earthing contact area 22.

As a result of the now very small distance between the magnetic element 46 and the contact magnet 104, the vehicle contact unit 64 is fixed in position in the horizontal direction. The contact magnet 104 and the magnetic element 46 are now vertically above one another and form the axis of rotation D, i.e. that a straight line forms the axis of rotation D through the centre of the magnetic element 46 and through the centre of the contact magnet 104 (FIG. 4).

The automatic alignment of the contact magnet 104 to one of the magnetic elements 46 ensures that the axis of rotation D always runs through an earthing contact area 22. The position of the axis of rotation D in the main lattice $G_H$ is thus always known.

However, this does not mean that the remaining contact electrodes 86, 90, 94 coincide with the remaining contact areas 22, 26, 30. Rather, different situations are conceivable in which the vehicle contact unit 64 is rotated relative to the ground contact unit 12. Three different situations are shown in FIGS. 7A, 8A, 9A.

FIG. 7A corresponds to the desired situation, in which the main lattice $G_H$ coincides with the base lattice $G_S$, and even all sublattices $G_{U1}$, $G_{U2}$, $G_{U3}$ coincide with the arrangements of the contact electrodes 86, 90, 94 on the base 78.

In this position, the earthing contact electrodes 86 contact the contact surfaces of the earthing contact areas 22, the neutral electrodes 90 contact the contact surfaces of the neutral contact areas 26 and the phase electrodes 94 contact the contact surfaces of the phase contact areas 30 and form corresponding contact points.

In this situation, the assignment of the contact points is correct, i.e. that only contact electrodes 86, 90, 94 are in contact with contact areas 22, 26, 30 of the same type, thus, for example, a neutral electrode 90 is not in contact with an earthing contact area 22 or a phase contact area 30.

Two situations are shown in FIGS. 8A and 9A, in which the main lattice $G_H$ and the base lattice $G_S$ are not situated one over the other, and thus no correct contact points or correct contacting is formed.

In the situation of FIG. 8A, the earthing contact electrodes 86 contact contact surfaces of the neutral contact areas 26 or phase contact areas 30.

In FIG. 9A, most of the contact electrodes, in particular the earthing contact electrodes 86, do not contact contact surfaces of the contact areas 22, 26, 30, but contact the insulating sections 49 between the different contact areas 22, 26, 30.

As previously mentioned, once the vehicle contact unit 64 has been completely lowered, the exact position of the contact areas 22, 26, 30 in relation to the contact electrodes 86, 90, 94 is unknown.

Therefore, the correct assignment of the contact areas 22, 26, 30 to the contact electrodes 86, 90, 94 must be checked. For this purpose, it must be determined whether a specific contact electrode contacts a corresponding, assigned contact area.

In this case, the specific contact areas and specific contact electrodes are the earthing contact areas 22 and the earthing contact electrodes 86. Furthermore, for example, these are the external earthing contact electrodes 86, i.e. those not located in the magnetic area 102.

Figure 7B:
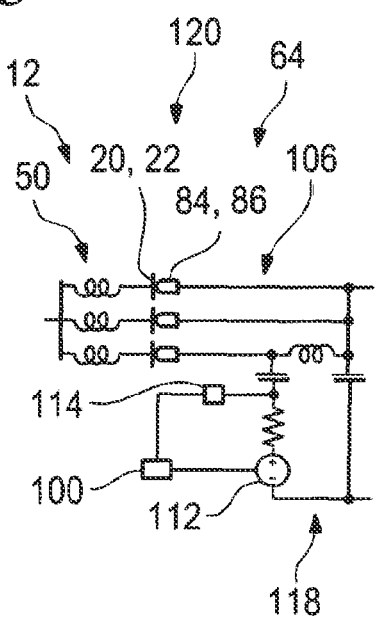
FIG. 7B shows one of the circuits formed by the coupling according to FIG. 7A, the FIGS. 8A and 9A show as situation similar to FIG. 7A, wherein the vehicle contact unit is rotated relative to the ground contact unit, the FIGS. 8B and 9B show a circuit resulting from the arrangement according to FIG. 8A or FIG. 9A.
Figure 8B:
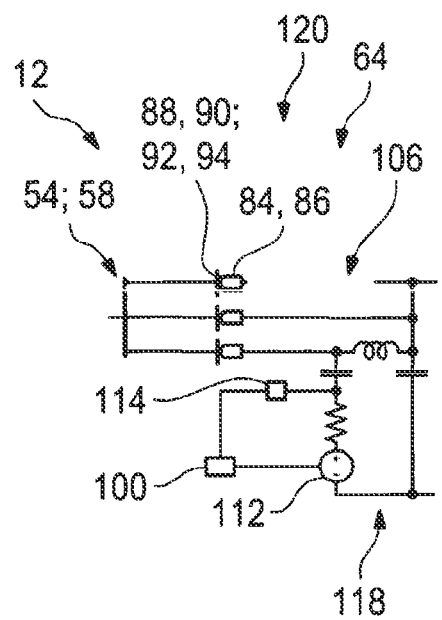
Figure 9B:
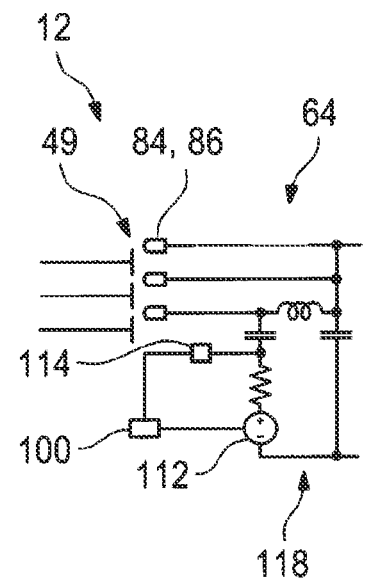

In FIGS. 7B, 8B and 9B, the circuit diagrams of a circuit 120 are shown schematically, which results in the situations of FIGS. 7A, 8A and 9A.

The shown circuit 120 consists of the first vehicle subcircuit 106 on the right side and one of the different ground subcircuits 50, 54, 58 and is not completely closed (FIG. 9).

In detail, the first vehicle subcircuit 106 comprises a resonant circuit 118 in each case, in which the signal source 112 and the measuring unit 114 are integrated.

The resonant circuit 118 is then extended via the earthing contact electrodes 86 depending of the respective situation by the first ground subcircuit 50, the second ground subcircuit 54 or the third ground subcircuit 58 or remains open in the case of the situation according to FIGS. 9A-9B.

However, it is also conceivable that there are no predetermined and separate ground subcircuits so that the first ground subcircuit 50, the second ground subcircuit 54 and the third ground subcircuit 58 are a linked subcircuit, wherein the corresponding ground subcircuits only form as a result of the contacting by the contact electrodes 86, 90, 94.

In other words, all the contact areas 22, 26, 30 are electrically connected to each other, for example as they have all been set to the protective earthing potential by the ground control unit 38. If three contact areas 22, 26, 30 are now contacted by the three ground contact electrodes 86 used to check the assignment, these contacted three contact areas 22, 26, 30 form the ground subcircuit used. The ground subcircuit formed in this way is either a first ground subcircuit 50, a second subcircuit 54 or a third subcircuit 58.

A high-frequency signal 112 is generated in the resonant circuit 118 by the signal source 112 in order to determine the correct assignment.

Induced by the high-frequency signal, a high-frequency response of the extended resonant circuit 118 results, the extended resonant circuit 118 now includes the entire circuit 120 comprising the first vehicle subcircuit 106 and if applicable, one of the ground subcircuits 50, 54, 58.

The measuring unit 114 determines the high-frequency response and transmits the high-frequency response to the control unit 100.

The control unit 100 compares the high-frequency response with one or more reference responses and determines which reference response is the closest match.

The reference responses can also be areas. The reference responses are for example empirically determined high-frequency responses that have been recorded in known circuits and stored in a memory of the control unit 100. A specific circuit is thus known for each reference response so that the circuit 120 formed can be determined using the reference response.

For example, specific characteristics, such as the attenuation of the high-frequency signal, can be used to assign the high-frequency signal to reference responses.

In the case of the situation according to FIGS. 7A-7B, the electrical leads 44 of the first ground subcircuit 50 have an increased characteristic impedance due to the resistance elements 48 which are shown in FIGS. 7A-7B as inductors in the first ground subcircuit 50.

The high-frequency response is therefore strongly attenuated and substantially coincides with a reference response that corresponds to a circuit 120 from the first vehicle subcircuit 106 and the first ground subcircuit 50. Thus, the control unit 100 can determine that the circuit 120 has been formed from the first vehicle subcircuit 106 and the first ground subcircuit 50, which means the three earthing contact electrodes 86 form a contact point with the earthing contact areas 22 or their contact surfaces. In this case, the correct assignment is assumed.

As the correct assignment has been determined, the ground control unit 38 can start the charging process. To this end, the ground control unit 38 of the ground contact unit 12 terminates the earthing and connects the neutral contact areas 26 and the phase contact areas 30 to the neutral conductor N and the phase conductor L to the corresponding power connections 40. In this case, only those neutral contact areas 26 and phase contact areas 30 that contact a contact electrode 90 or 94 are supplied with current.

Similarly, the control unit 100 of the vehicle contact unit 64 can connect the neutral electrode 90 and the phase electrode 94 to the neutral conductor N and the phase conductor P of the on-board power supply of the vehicle 10.

Thus, the on-board power supply of the vehicle 10 is integrated into the local electricity network of the charging structure and the vehicle 10 can now be charged. The conductive connection is thus produced automatically without the intervention of a person.

However, unforeseen situations can occur during charging which at least necessitate that the charging is immediately aborted. For example, the vehicle 10 can be moved in a rear-end collision, i.e. if another vehicle impacts the charging vehicle 10, and the vehicle contact unit 64 is separated from the ground contact unit 12 not as planned.

In order to recognise such situations, the physical contact between the contact electrodes 86, 90, 94 and the contact surfaces is checked continually or at regular intervals by means of the signal source 112 and the measuring unit 114, as described above.

If it is determined that the contact has been broken, an emergency function is activated that at least can include the immediate switching off of the charging current.

In the situations of FIGS. 8A-8B and 9A-9B, charging cannot be started immediately after the lowering.

The circuit 120 of the situation according to FIGS. 8A-8B contains the first vehicle subcircuit 106 on the one hand and on the other hand the second ground subcircuit 54 or the third ground subcircuit 58 depending on whether the earthing contact electrodes indicated in FIG. 8A by the reference 86.1 or the earthing contact electrodes 86 indicated by the reference 86.2 are part of the first vehicle subcircuit 106.

As no resistance elements 48 are provided on the electrical leads 44 in the second ground subcircuit 54 and third ground subcircuit 58, the characteristic impedance of the second and third ground subcircuits 54, 58 is greatly reduced compared to the first ground subcircuit 50.

Of course, this has an effect on the circuit 120 and the resonant circuit 118 so that the high-frequency response caused by the signal source 112 by means of the high frequency signal and measured by the measuring unit 114 differs. In particular, the high-frequency signal is now not attenuated so strongly.

Using the comparison of the high-frequency response with the reference responses, the control unit 100 determines that the obtained high-frequency response equals a reference response that is assigned to a circuit 120 formed from the first vehicle subcircuit 106 and the second ground subcircuit 54 and the third ground subcircuit 58.

As a result, the control unit 100 can determine that the earthing contact electrodes 86 form contact points with the contact surfaces of the neutral contact areas 26 and the phase contact areas 30. In this case, the control unit 100 now determines that a situation according to FIG. 8A exists. The control unit 100 therefore knows that the vehicle contact unit 64 must be rotated clockwise relative to the ground contact unit 12 by an angle of 30° in order to achieve a correct assignment.

The control unit 100 then controls the aligning actuator 60 and the electric motor 66 in such a way that the vehicle contact unit 64, more specifically the base 78, is rotated by 30° about the axis of rotation D, i.e. about the magnetic area 102. In this way, the situation of FIG. 7A is achieved.

The base is rotated along the ground contact unit 12 when being rotated, in particular without lifting the base 78 and without lifting the contact electrodes 84, 88, 92 and 86, 90, 94 from the contact surfaces.

After completion of the rotation or even during rotation, a new check can take place by feeding a high-frequency signal into the first vehicle subcircuit 106. This measurement results in the result previously described for FIG. 7B. The control unit 100 may then start charging.

In the situation of FIGS. 9A-9B, no electrical connection is generated between the first vehicle subcircuit 106 and another ground subcircuit 50, 54, 58 so that no complete circuit 120 is formed as in FIGS. 7A-7B and 8A-8B.

Nevertheless, a high-frequency signal fed into the resonant circuit 118 generates a high-frequency response which can be detected by the measuring unit 114.

A reference response has also been stored in the control unit 100 for this situation so that the control unit 100 can also recognize this situation. In this situation, the control unit 100 effects a rotation of the vehicle contact unit 64 about the axis of rotation D and measures anew the assignment of the contact points at regular intervals, e.g. after a specific rotational angle, when it reaches either the situation of FIG. 8A or the situation of FIG. 7A that are identifiable by their positions.

Of course, it is also conceivable that the signal source 112 and the measuring unit 114 are provided in the ground contact unit 12. In this case, the high frequency signal is generated in one of the ground subcircuits 50, 54, 58 and measured by the measuring unit 114. The principle of the measurement does not change as a result of this.

Of course, a signal source 112 and one measuring unit 114 may each be provided in both the vehicle contact unit 64 and in the ground contact unit 12, thereby making it possible to determine the correct assignment and proper contacting by the vehicle 10 as well as by the ground contact unit 12. As a result, the operational reliability of the vehicle coupling system 15 is increased.

In the other figures, further embodiments of the vehicle connection device 14 and the ground contact unit 12, thus also the vehicle coupling system 15, are shown that substantially correspond to the first embodiment. Therefore, only the differences are discussed hereinafter and the same parts and parts with the same function are provided with the same reference signs.

Figure 10:
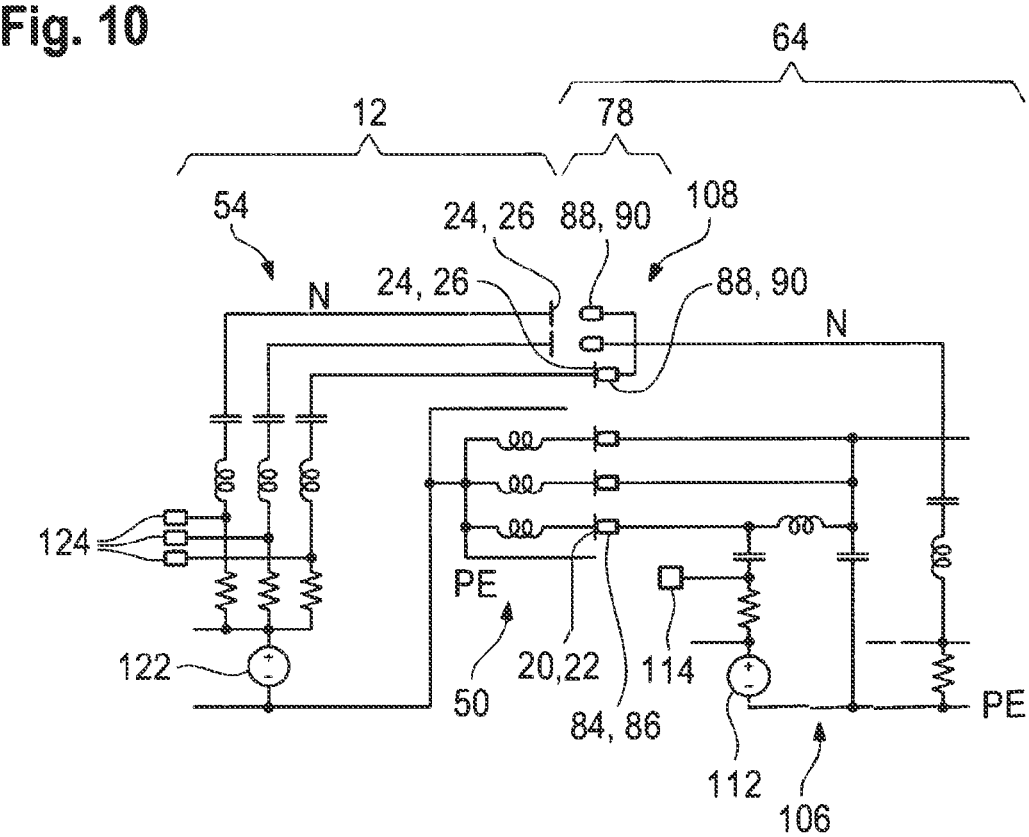
FIG. 10 shows a part of the circuit diagram of a second embodiment of a vehicle coupling system according to the disclosure.

A circuit diagram of part of a second embodiment of the vehicle coupling system is shown in FIG. 10. In particular, this second embodiment may be combined with or supplement the first embodiment.

In this embodiment, the ground contact unit 12 comprises a signal source 122 and at least one measuring unit 124.

In the shown embodiment, three neutral contact areas 26 are each shown with one measuring unit 124. For example, each neutral contact area 26 is assigned to a measuring unit 124, thus electrically connected to it.

It is possible to determine by means of the signal source 122 and the measuring units 124 which neutral contact areas 26 contact neutral electrodes 90. This is preferably determined after it has been established that the assignment on the contact points is correct.

For example, the neutral electrodes 90 and the earthing contact electrodes 86 are electrically connected to each other in the vehicle contact unit 64 by the control unit 100 of the vehicle connection device 14 in order to determine the contacted neutral contact areas 26.

The neutral contact electrodes 90 can also be permanently electrically connected to each other, as can be seen in FIG. 10.

The signal source 122 can be electrically connected to one or more of the neutral contact areas 26, the contacting of which is to be determined by a switching device 140, in particular a relay or a multiplexer. The neutral contact areas 26 to be measured are thus part of further circuit 142 in the case of a contacting.

Now, a high-frequency signal is generated by the signal source 122 of the ground contact unit 12 and transmitted to the vehicle contact unit 64 via the neutral contract areas 26 and neutral electrodes 90.

If the neutral contact areas 26 to be measured contact a neutral electrode 90, the high-frequency signal is transmitted anew in the ground contact unit 12 and can be recorded by one of the measuring units 124.

If the neutral contact areas 26 to be measured does not contact a neutral electrode 90, the resonant circuit remains interrupted and a high-frequency signal cannot be detected at the measuring unit 124.

The ground control unit 38 of the ground contact unit 12 can thus determine which neutral contact areas 26 contact the neutral electrodes 90 based on the measurement results from the measuring units 124 and the setting of the switching device 140.

FIGS. 14A, 14B, 14C and 14D show the procedure for determining the contacted neutral contact areas 26 and thus the procedure for determining the position of the vehicle contact unit 64 in more detail in the case that the neutral electrodes 90 are electrically connected to each other in the base 78.

Figure 14A:
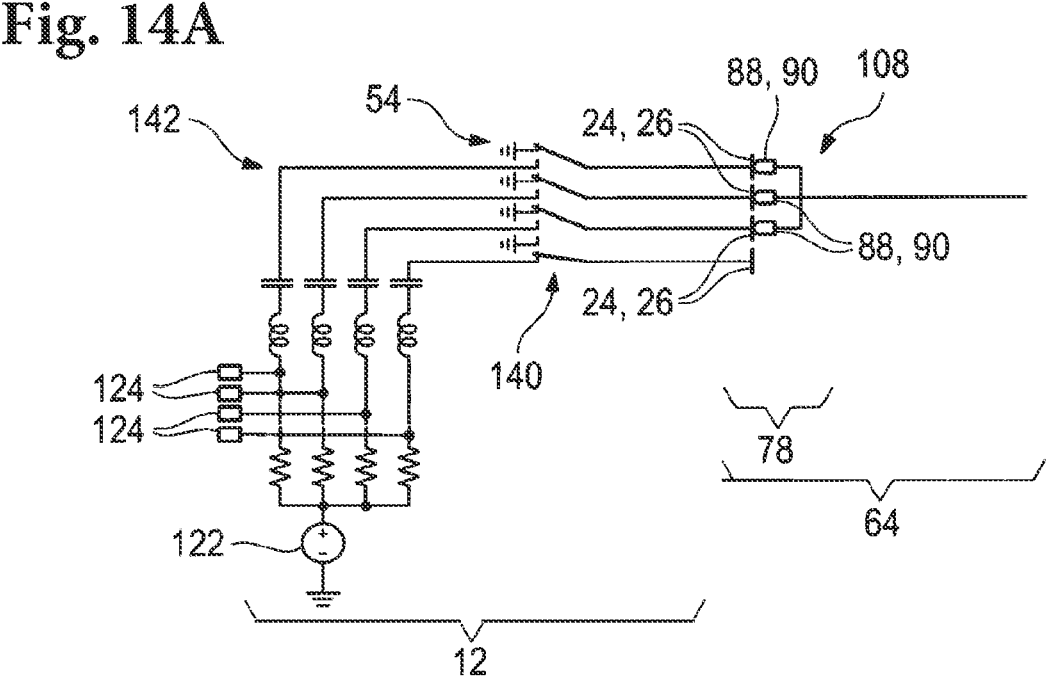

FIG. 14A only shows the second ground subcircuit 54 and the second vehicle subcircuit 108, which are part of the circuit 142 used. For simplicity, it is shown that a contact of the signal source 122 is earthed, as this corresponds to the function of the set up.

Four neutral contact areas 26 are shown, three of which are contacted by the neutral electrodes 90 of the vehicle contact unit 64.

The switching element 140 is illustrated by switches, each of which is capable of connecting a neutral contact area 26 to a signal source 122 or the protective earthing.

Initially, in each case, only one neutral contact area 26 is connected to the signal source 122 by means of the assigned switch and the signal in the circuit 142 is measured by means of the measuring units 124.

In the situation shown in FIG. 14A, a neutral contact area 26 has been connected to the signal source 122 that is not contacted. Therefore, there is no connection to the protective earthing so that the signal source 122 cannot generate a high frequency signal in the circuit 142. None of the measuring units 124 detect a high-frequency signal, thereby determining that the neutral contact area 26 connected to the signal source 122 is not contacted. The connection to the signal source 122 is then disconnected by the switching element 140 and another neutral contact area 26 is connected to the signal source 122, as shown in FIG. 14B.

Figure 14B:
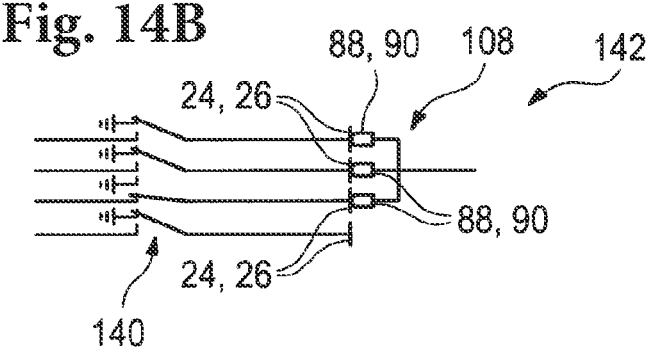

In the situation of FIG. 14B, the neutral contact area 26 connected to the signal source 122 is contacted by a neutral electrode 90, i.e. the second vehicle subcircuit 108 is connected to the second ground subcircuit 54.

As the neutral electrode 90 is electrically connected to the other neutral electrodes 90 by the second vehicle subcircuit 108, there is also now an electrical connection to the additional contacted neutral contact areas 26 that are earthed by the switching element 140. In this way, the necessary earthing is provided so that a high-frequency signal is generated in the circuit 142 by the signal source 122 that is detected by the measuring unit 124. As a result, it is determined that the corresponding neutral contact area 26 is contacted.

Figure 14C:
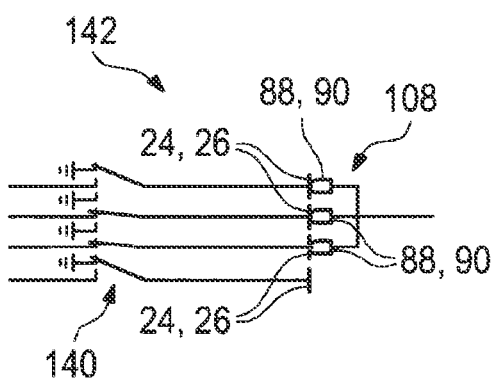

In the next step, a further neutral contact area 26 is then connected to the signal source 122 by the switching element 140 (cf. FIG. 14c). This neutral contact area 26 is selected in such a way that it is in the vicinity of the contacted neutral contact area 26. If this neutral contact area 26 is also contacted, the high-frequency signal is also detected by the corresponding measuring unit 124, thereby determining the contacting.

Once two neutral contact areas 26 are known to be contacted, there can only be two possibilities as to which of the neutral contact areas 26 is the missing third neutral contact area 26.

Figure 14D:
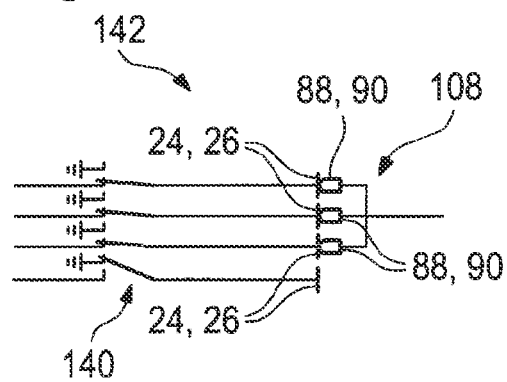

One of these two neutral contact areas 26 is then connected to the signal source 122 by the switching element 140 (cf. FIG. 14d). As described previously, whether this neutral contact area 26 is also contacted is determined then by means of the assigned measuring unit 124.

If this is the contacted neutral contact area 26, the determination of the position of the base 78 and the vehicle contact unit 64 relative to the ground contact unit 12 is completed successfully and the position is now known. From the position, it is possible to directly determine the contacted phase contact areas 30.

Similarly, it is possible to determine which of phase contact areas 30 contact the phase electrodes 94.

By means of this method, it is also possible to check whether the contact between the contact electrodes 86, 90, 94 and the contact surfaces have been interrupted during charging, in order to be able to activate an emergency function, if necessary.

Figure 11:
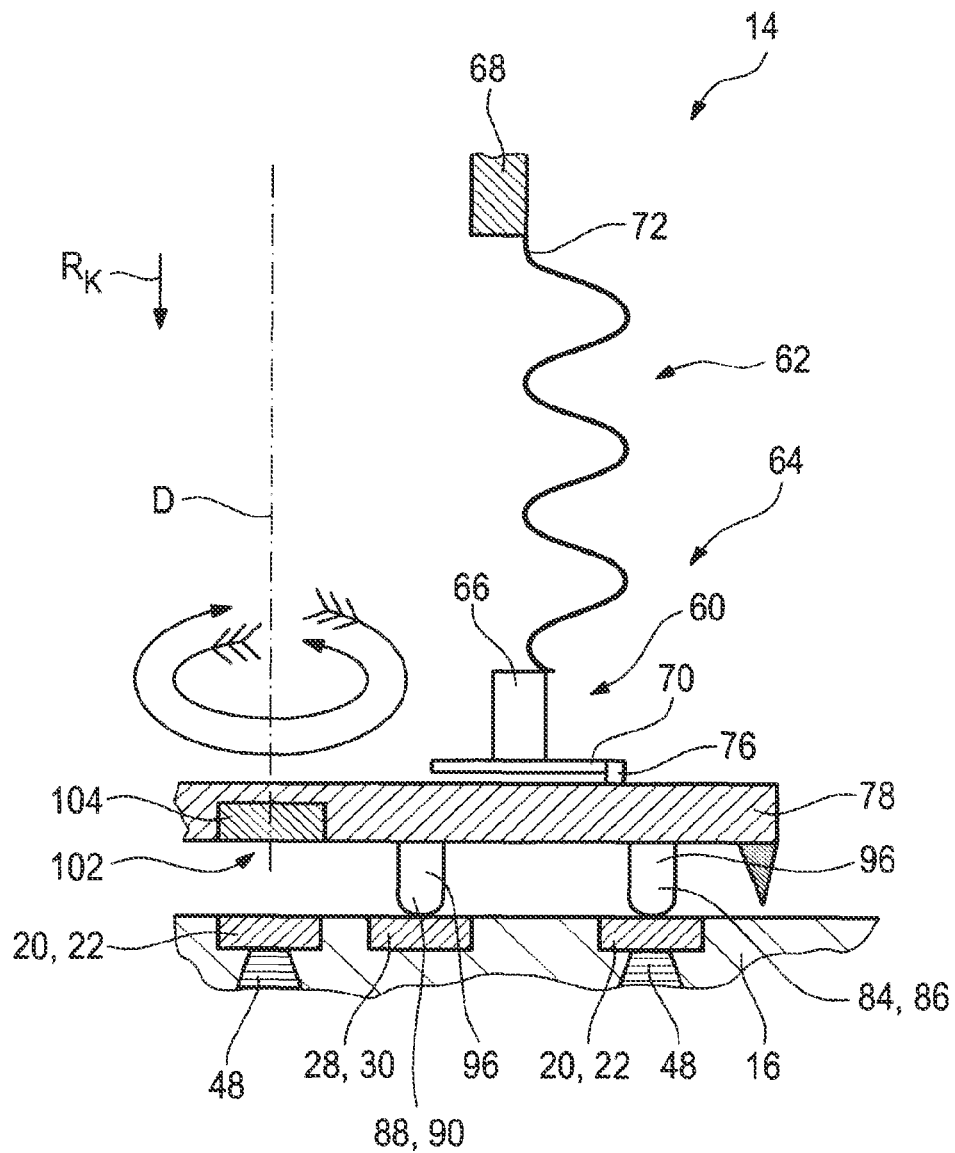
FIG. 11 shows a very simplified, partial sectional view of a third embodiment of a vehicle connection device according to the disclosure, FIG. 12 schematically shows the configuration of the different contact areas of a fourth embodiment of a ground contact unit according to the disclosure, FIG. 13 schematically shows the arrangement of contact electrodes of a fourth embodiment of a vehicle connection device according to the disclosure, and the FIGS. 14A, 14B, 14C and 14D show a part of the circuit diagram of a further embodiment of a vehicle coupling system according to the disclosure during different steps in establishing the contacted neutral contact areas.

FIG. 11 is similar to FIG. 4 and shows a third embodiment of the vehicle connection device 14. The difference from the first embodiment is the arrangement of the aligning actuator 60.

In this second embodiment, the aligning actuator is provided between the vehicle contact unit 64 and the contacting actuator 62.

To this end, the base 78 has the teeth 76, in which the gear 70 of the aligning actuator 60 engages. The gear 70 is coupled to the electric motor 66 which is connected on the base end of the contacting actuator 62 in a rotationally fixed manner.

The base 78 and thus the entire vehicle contact unit 64 are mounted rotatably on the contacting actuator 62 via bearings not shown.

The contacting actuator 62 is installed on its vehicle-facing end onto the mounting section 68 in a rotationally fixed manner. It is also conceivable that it is mounted on the vehicle 10 directly.

Figure 12:
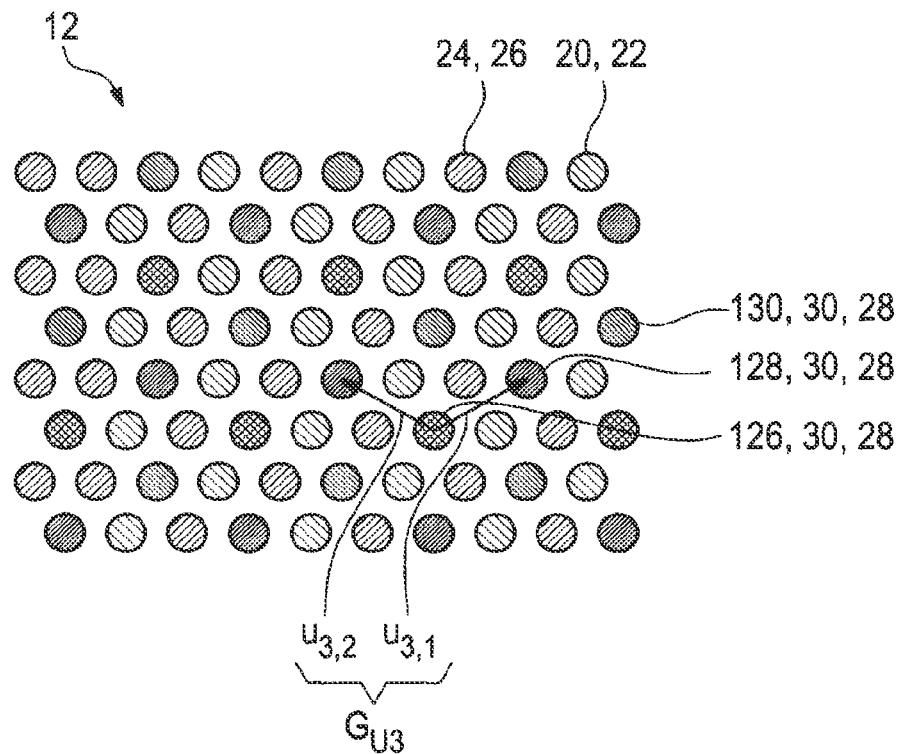
Figure 13:
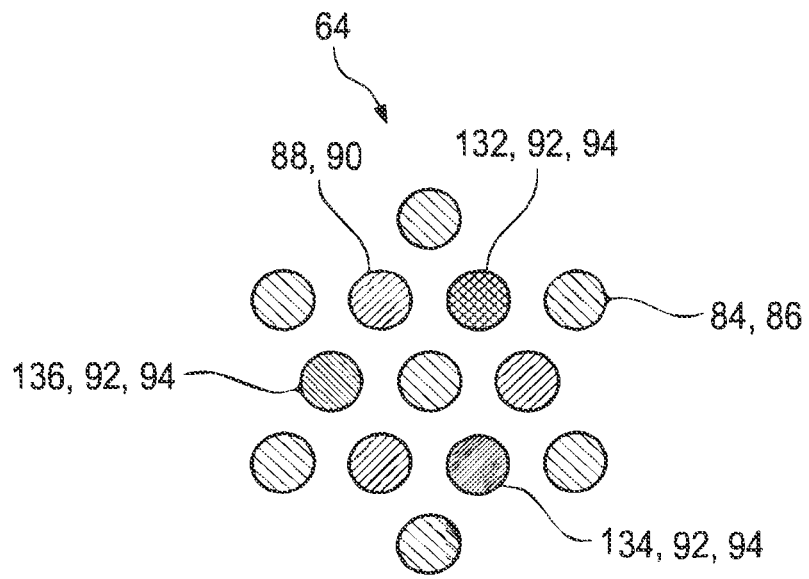

The contact areas 22, 26, 30 and the contact electrodes 86, 90, 94 are shown in their arrangement in the corresponding lattices in FIGS. 12 and 13, similar to FIGS. 3 and 6.

In contrast to the first embodiment, not only is one type of phase contact areas or phase electrodes 94 provided, but also three different ones in each case, in order to be capable of transmitting three-phase current. Accordingly, the local electricity network is a three-phase alternating current network and the ground contact unit 12 comprises three different power connections 40 for the phase conductors or live conductors.

The ground contact unit 12 thus comprises several L1 contact areas 126, several L2 contact areas 128 and several L3 contact areas 130.

The L1 contact areas 126, L2 contact areas 128 and L3 contact areas 130 form the phase contact areas 30.

The L1, L2 and L3 contact areas 126, 128 and 130 are thus provided on the lattice points of the three sublattices $G_{U3}$, wherein they are provided alternately in turn in the direction of at least one of the base vectors of the third sublattice $G_{U3}$.

In other words, there is not a pair of closest neighbouring contact areas in the third sublattice $G_{U3}$ consisting of the same contact areas of the L1 contact areas 126, the L2 contact areas 128 and the L3 contact areas 130. For example, the nearest neighbouring contact areas of an L1 contact area 126 are in each case three L2 contact areas 128 and three L3 contact areas 130.

With regards to the electrical connections, the L1 contact areas 126, L2 contact areas 128 and L3 contact areas 130 are each connected to one of live conductors of the local electricity network. To check the contacting, they can however all form the third ground subcircuit 58 collectively.

In a similar way, the vehicle contact unit 64 comprises an L1 phase electrode 132, an L2 phase electrode 134 and an L3 phase electrode 136, that form together the phase electrodes 94.

In the shown example in FIG. 12, there is an L1, an L2 and an L3 phase electrode 132, 134 and 136 each, which in relation to the first embodiment each form one the phase electrodes 94.

The L1, L2 and L3 phase electrode 132, 134, 136 are each electrically connected to one of the live conductors of the on-board power supply of the vehicle or connected together to the third vehicle subcircuit 110 by the control unit 100.

The configuration or sequence of the L1, L2 and L3 contact areas 126, 128 and 130 in the third sublattice $G_{U3}$ corresponds to the sequence of the L1, L2 and L3 phase electrodes 132, 134 and 136 in the contacting area 80. Thus, L1, L2 and L3 contact areas 126, 128 and 130 contact the L1, L2 and L3 phase electrodes 132, 134 and 136 with the correct alignment of the vehicle contact unit 64 to the ground contact unit 12, analogous to FIG. 7A.

Even if the ground contact unit 12, as described, comprising the L1, L2 and L3 contact areas 126, 128 and 130, is designed for charging the vehicle 10 with three-phase alternating current, it is nevertheless possible that a vehicle 10 only configured for charging with single-phase alternating current, thus is only provided with identical phase electrodes 94, is charged via this ground contact unit 12.

To this end, the vehicle contact unit 64 is brought into contact with the ground contact unit 10 as previously described. Subsequently, however, only one of the phase electrodes 94 is electrically connected to the live conductor of the on-board power supply of the vehicle 10 and used for charging.

The remaining two phase electrodes 94 are, for example, not connected on the side facing towards the vehicle and/or the phase electrodes 132, 134, 136 that are not used for charging are kept potential free or connected to the protective earth conductor.

Other arrangements are also conceivable, in which the L1, L2 and L3 contact areas 126, 128, 130 and the L1, L2 and L3 phase electrodes 132, 134, 136 are also provided instead of the neutral contact areas 26 and the neutral electrodes 88 so that in each case two L1, L2 and L3 phase electrodes 132, 134, 136 are present on the vehicle contact unit 64. As a result, the lead cross-section can be increased for each of the phases so that greater charging currents are possible.

It is also conceivable that the signal source 112 is provided in the vehicle contact unit 64 and the measuring unit 124 in the ground contact unit 12, or vice versa. In this way, the correct assignment can be determined, as described above.

Moreover, data from the signal source 112 can be transmitted in this case to the measuring unit 124 by means of the high-frequency signal. Thus, a unidirectional data flow is possible from the vehicle contact unit 64 to the ground contact unit 12, or vice versa.

If both the vehicle contact unit 64 and the ground contact unit 12 comprise the signal source 112, 122 and the measuring unit 114, 124, a bidirectional data exchange is possible between the vehicle contact unit 64 and the ground contact unit 12, thus between the vehicle 10 and the remaining charging system.

The same contact points can be used for transmitting data as for transmitting electricity and the data transmission is also possible during a charging process as the high-frequency signals can be modulated onto the charging current.

Of course, features of the individual embodiments can be combined with each other as desired.

The invention claimed is:

1. A ground contact unit for a vehicle battery charging system for automatically, conductively connecting the ground contact unit and a vehicle contact unit, comprising a plate-like base body as well as first contact areas, second contact areas and third contact areas that are arranged on a target surface of the base body in a main lattice in a form of a two-dimensional Bravais lattice,
   wherein the first contact areas are arranged in a first sublattice in a form of a two-dimensional Bravais lattice, the second contact areas are arranged in a second sublattice in a form of a two-dimensional Bravais lattice and the third contact areas are arranged in a third sublattice in a form of a two-dimensional Bravais lattice,
   wherein the first sublattice, the second sublattice and the third sublattice are interlaced with each other,
   wherein the first contact areas, the second contact areas and the third contact areas occur alternately in a direction of at least one base vector of the main lattice.

2. The ground contact unit according to claim 1, wherein the ground contact unit comprises a ground control unit as well as a first ground connection, a second ground connection and a third ground connection for connecting the ground contact unit on a ground side,
   wherein the first contact areas are electrically connected to the first ground connection, and
   wherein the ground control unit is set up to switch the electric connection of the second contact areas between at least two of the first ground connection, the second ground connection and an earthing and/or to switch the electric connection of the third contact areas between at least two of the first ground connection, the third ground connection and an earthing.

3. The ground contact unit according to claim 1, wherein the first contact areas are earthing contact areas, the second and third contact areas both have an electrical potential, the electrical potentials of the second and third contact areas differing from each other.

4. The ground contact unit according to claim 1, wherein the second contact areas are neutral contact areas or positive direct-current contact areas and/or the third contact areas are phase contact areas or negative direct-current contact areas.

5. The ground contact unit according to claim 1, wherein at least two of the three sublattices are identical lattices and/or at least two of the main lattice and the three sublattices are of a same type.

6. The ground contact unit according to claim 1, wherein the main lattice, the first sublattice, the second sublattice and/or the third sublattice are hexagonal lattices.

7. The ground contact unit according to claim 1, wherein at least three second contact areas and/or at least three third contact areas are provided for transmitting three-phase electric power, wherein at least one of said at least three second and/or third contact areas is an L1 contact area, at least another of said at least three second and/or third contact areas is an L2 contact area and at least one further one of said at least three second and/or third contact areas is an L3 contact area, wherein said at least one L1 contact area, said at least one L2 contact area and said at least one L3 contact area occur alternately in a direction of at least one base vector of the third sublattice.

8. The ground contact unit according to claim 1, wherein magnetic elements are provided in or on the base body in the first contact areas, the second contact areas and/or the third contact areas.

9. The ground contact unit according to claim 8, wherein the magnetic elements each encompass an electrical lead that electrically contacts a corresponding contact area.

10. The ground contact unit according to claim 1, wherein the ground contact unit comprises a signal source for a high-frequency signal and/or a measuring unit for a high-frequency signal that is electrically connected to the first contact areas, the second contact areas and/or the third contact areas.

11. An automatic vehicle coupling system comprising a vehicle connection device and a ground contact unit, the vehicle contact unit comprising a base with a contacting area in which at least one first contact electrode, at least one second contact electrode and at least one third contact electrode are provided, wherein the vehicle contact unit is moveable towards the ground contact unit in a contact direction in order to bring said at least one first contact electrode, said at least one second contact electrode and said one at least one third contact electrode in contact with the ground contact unit, an aligning actuator that is connected to the base in such a way that it is able to rotate the base relative to a mounting section about an axis of rotation running substantially in the contact direction, the ground contact unit comprising a plate-like base body as well as first contact areas, second contact areas and third contact areas that are arranged on a target surface of the base body in a main lattice in a form of a two-dimensional Bravais lattice, wherein the first contact areas are arranged in a first sublattice in a form of a two-dimensional Bravais lattice, the second contact areas are arranged in a second sublattice in a form of a two-dimensional Bravais lattice and the third contact areas are arranged in a third sublattice in a form of a two-dimensional Bravais lattice, wherein the first sublattice, the second sublattice and the third sublattice are interlaced with each other, wherein the first contact areas, the second contact areas and the third contact areas occur alternately in the direction of at least one base vector of the main lattice.

12. The automatic vehicle coupling system according to claim 11, wherein the base lattice and the main lattice correspond with each other substantially and/or the aligning actuator is connected to the base in such a way that it is able to rotate the base along the ground contact unit.

13. The automatic vehicle coupling system according to claim 12, wherein the aligning actuator is able to rotate the base along the ground contact unit in a case of an existing contact between the first, second, and third contact electrodes and the first, second, and third contact surfaces, respectively.

14. The automatic vehicle coupling system according to claim 11, wherein vehicle connection device comprises a magnetic area in the contacting area, in said magnetic area a contact magnet is located in or on the base, wherein the contact magnet determines a position of the axis of rotation, and wherein magnetic elements are provided in or on the base body in the first contact areas, the second contact areas and/or the third contact areas, wherein the magnetic elements of the vehicle contact unit interact with the contact magnets in order to fix the vehicle contact unit in position on the ground contact unit and to form the axis of rotation.

15. A method for automatically, conductively connecting a vehicle contact unit with a ground contact unit, the vehicle contact unit comprising a base with a contacting area in which at least one first contact electrode, at least one second contact electrode and at least one third contact electrode are provided, wherein the vehicle contact unit is moveable towards the ground contact unit in a contact direction in order to bring said at least one first contact electrode, said at least one second contact electrode and said one at least one third contact electrode in contact with the ground contact unit, an aligning actuator that is connected to the base in such a way that it is able to rotate the base relative to a mounting section about an axis of rotation running substantially in the contact direction, the ground contact unit comprising a plate-like base body as well as first contact areas, second contact areas and third contact areas that are arranged on a target surface of the base body in a main lattice in a form of a two-dimensional Bravais lattice, wherein the first contact areas are arranged in a first sublattice in a form of a two-dimensional Bravais lattice, the second contact areas are arranged in a second sublattice in a form of a two-dimensional Bravais lattice and the third contact areas are arranged in a third sublattice in a form of a two-dimensional Bravais lattice, wherein the first sublattice, the second sublattice and the third sublattice are interlaced with each other, wherein the first contact areas, the second contact areas and the third contact areas occur alternately in a direction of at least one base vector of the main lattice, the method comprising steps of:
a) lowering the vehicle contact unit towards the ground contact unit in a contact direction until the vehicle contact unit contacts the ground contact unit,
b) checking whether at least one specific contact electrode of the vehicle contact unit contacts at least one corresponding specific contact area of the ground contact unit, and
c) rotating the vehicle contact unit about an axis of rotation if no or insufficient electrical contact exists between said at least one specific contact electrode and said at least one corresponding specific contact area.

16. The method according to claim 15, wherein whether said at least one specific contact electrode contact contacts said at least one corresponding contact area is checked during rotation or after the rotation is completed.

17. The method according to claim 15, wherein said at least one specific contact electrode is one or more of said at least one first contact electrode and said at least one specific contact area is one or more of said at least one first contact area.

18. The method according to claim 15, wherein the vehicle contact unit is aligned to the ground contact unit when lowering the vehicle contact unit by a contact magnet at the vehicle contact unit which is being attracted by a magnetic element in or on the ground contact unit to define the axis of rotation.

\* \* \* \* \*